United States Patent
Tamura

(10) Patent No.: US 12,504,047 B2
(45) Date of Patent: Dec. 23, 2025

(54) POWER TRANSMISSION DEVICE

(71) Applicant: NSK-WARNER K.K., Tokyo (JP)

(72) Inventor: Nariaki Tamura, Shizuoka (JP)

(73) Assignee: NSK-WARNER K.K., Tokyo (JP)

( * ) Notice: Subject to any disclaimer, the term of this patent is extended or adjusted under 35 U.S.C. 154(b) by 0 days.

(21) Appl. No.: 18/988,143

(22) Filed: Dec. 19, 2024

(65) Prior Publication Data

US 2025/0230846 A1    Jul. 17, 2025

(30) Foreign Application Priority Data

Jan. 12, 2024   (JP) .................................. 2024-003311

(51) Int. Cl.
  *F16D 41/10*   (2006.01)
  *F16D 41/066*  (2006.01)

(52) U.S. Cl.
  CPC ......... *F16D 41/105* (2013.01); *F16D 41/066* (2013.01)

(58) Field of Classification Search
  CPC ....... F16D 41/10; F16D 41/105; F16D 41/066
  See application file for complete search history.

(56) References Cited

U.S. PATENT DOCUMENTS 6,491,150 B1 * 12/2002 Hochmuth ............ F16D 41/066
                                                192/39
2016/0341267 A1   11/2016 Takada
2019/0211891 A1 *  7/2019 Reimchen ............ F16D 41/067

FOREIGN PATENT DOCUMENTS

| JP | 1-266359 A | 10/1989 |
|----|------------|---------|
| JP | 2002-130335 A | 5/2002 |
| JP | 2014-077510 A | 5/2014 |
| JP | 2015-206455 A | 11/2015 |
| JP | 2018-112277 A | 7/2018 |

OTHER PUBLICATIONS

JPO Office Action for Application No. 2024-003311 dated May 7, 2024.

* cited by examiner

*Primary Examiner* — Lori Wu
(74) *Attorney, Agent, or Firm* — Sughrue Mion, PLLC

(57) ABSTRACT

A power transmission device includes: a fixing member having a cylindrical surface; an output shaft having a facing surface facing the cylindrical surface; an input shaft having a pressing portion disposed between the cylindrical surface and the facing surface; and a pair of rolling elements. The facing surface includes a recessed surface. The recessed surface has a bottom surface and a pair of pressed surfaces. The bottom surface has a central surface and a pair of cam surfaces. A distance between the cam surface and the cylindrical surface increases from the central surface toward the pressed surface. A distance between the cam surface and the cylindrical surface is smaller than a diameter of the rolling element in the portion closer to the central surface, and is greater than the diameter of the rolling element in the portion closer to the pressed surface.

6 Claims, 17 Drawing Sheets

POWER TRANSMISSION DEVICE

CROSS-REFERENCE TO RELATED APPLICATION(S)

The present application claims priority to and incorporates by reference the entire contents of Japanese Patent Application No. 2024-003311 filed in Japan on Jan. 12, 2024.

BACKGROUND OF THE INVENTION

1. Field of the Invention

The present disclosure relates to a power transmission device.

2. Description of the Related Art

The power transmission device is a device that transmits torque generated by a machine such as a motor. Such a power transmission device is used, for example, to drive a part such as an arm of an industrial robot. The power transmission device includes: an input shaft to which torque is input; and an output shaft that outputs torque. The output shaft is connected to an object to be driven and receives an input of an own weight of the object (hereinafter, referred to as an external force). Rotation of the output shaft would hinder retention of the position of the object. Therefore, in order to retain the angle of the output shaft, it is necessary to continuously issue a command to the motor to retain the position of the object. Meanwhile, the power transmission device of JP 2015-206455 A enables transmission of torque from the input shaft to the output shaft, and can restrict the rotation of the output shaft when an external force is input to the output shaft.

Details of the power transmission device of JP 2015-206455 A are as follows. The power transmission device includes a carrier (input shaft), a flange plate, an unlocking plate, and an output shaft, which are disposed coaxially. The power transmission device further includes: an outer ring into which the output shaft is inserted; a plurality of cylindrical rollers and an elastic body disposed between the outer ring and the output shaft. The cylindrical roller is biased by the elastic body. The cylindrical roller, when having moved in the biased direction, is to be caught between an inner circumferential surface of the outer ring and an outer circumferential surface of the output shaft. This restricts the rotation of the output shaft. The flange plate is connected to the output shaft. When the unlocking plate rotates, the unlocking plate pushes out the cylindrical roller against the biasing force of the elastic body. This operation cancels the state in which the cylindrical roller is caught between the outer ring and the output shaft, unlocking the output shaft. In addition, rotation of the carrier allows the carrier to first transmit torque to the unlocking plate via a protrusion and then transmit torque to the flange plate with a delay. That is, after the unlocking plate rotates to unlock the output shaft, the flange plate rotates to transmit the torque to the output shaft.

Meanwhile, the power transmission device in JP 2015-206455 A has a large loss of torque transmitted from the input shaft to the output shaft (hereinafter, referred to as a torque loss).

SUMMARY OF THE INVENTION

A power transmission device includes: a fixing member having a cylindrical surface, the cylindrical surface facing an inner side in a radial direction or an outer side in the radial direction; an output shaft having a facing surface facing the cylindrical surface; an input shaft having at least one or more pressing portion, the pressing portion disposed between the cylindrical surface and the facing surface; and a pair of rolling elements disposed between the cylindrical surface and the facing surface and on either side of the pressing portion in a circumferential direction. The facing surface includes a recessed surface, the recessed surface being recessed in the radial direction and formed to accommodate the pressing portion and the pair of rolling elements. The recessed surface includes: a bottom surface; and a pair of pressed surfaces extending in the radial direction from ends of the bottom surface in the circumferential direction and facing the circumferential direction. A surface of the pressing portion in the circumferential direction is a pressing surface that presses the pressed surface via the rolling element. The bottom surface includes: a central surface located at a central portion of the recessed surface in the circumferential direction, with the pressing portion being disposed between the central surface and the cylindrical surface; and a pair of cam surfaces located at either end of the recessed surface in the circumferential direction, with the rolling element being disposed between the cam surfaces and the cylindrical surface. The cam surface is formed such that a distance between the cam surface and the cylindrical surface gradually increases from the central surface toward the pressed surface. A distance between a portion of the cam surface closer to the central surface and the cylindrical surface is smaller than a diameter of the rolling element. A distance between the cylindrical surface and a portion of the cam surface closer to the pressed surface is greater than a diameter of the rolling element.

The above and other objects, features, advantages and technical and industrial significance of this disclosure will be better understood by reading the following detailed description of presently preferred embodiments of the disclosure, when considered in connection with the accompanying drawings.

DETAILED DESCRIPTION OF THE PREFERRED EMBODIMENTS

A mode for carrying out the present disclosure will be described in detail with reference to the drawings. The present disclosure is not limited by the following description. In addition, the constituents described below include those easily conceivable to those skilled in the art and those that are substantially the same. Furthermore, the components described below can be appropriately combined with each other.

First Embodiment

Figure 1:
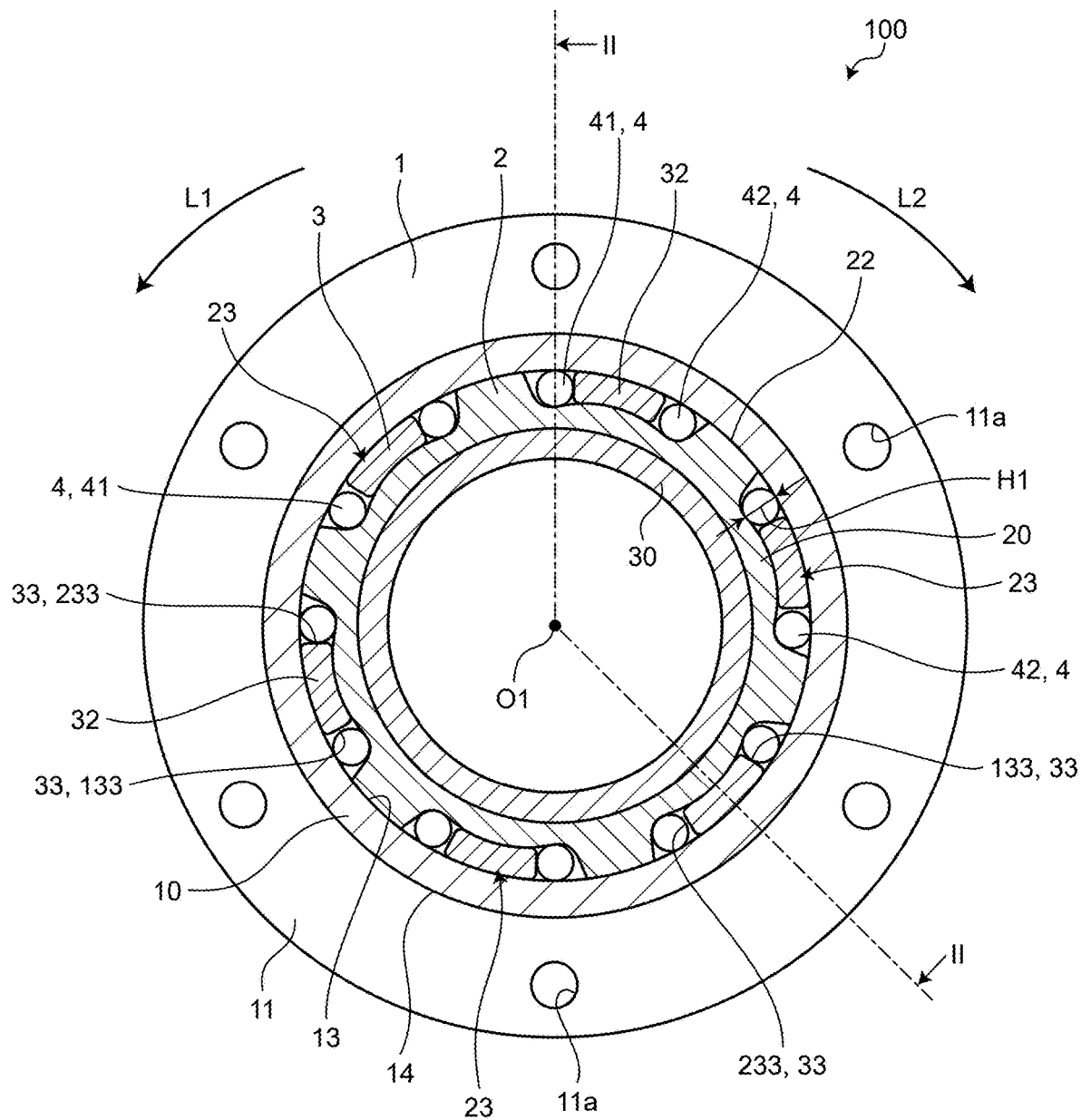
FIG. 1 is a cross-sectional view of a power transmission device according to a first embodiment taken in a direction orthogonal to an axial direction, and is specifically a cross-sectional view taken along line I-I in FIG. 2.
Figure 2:
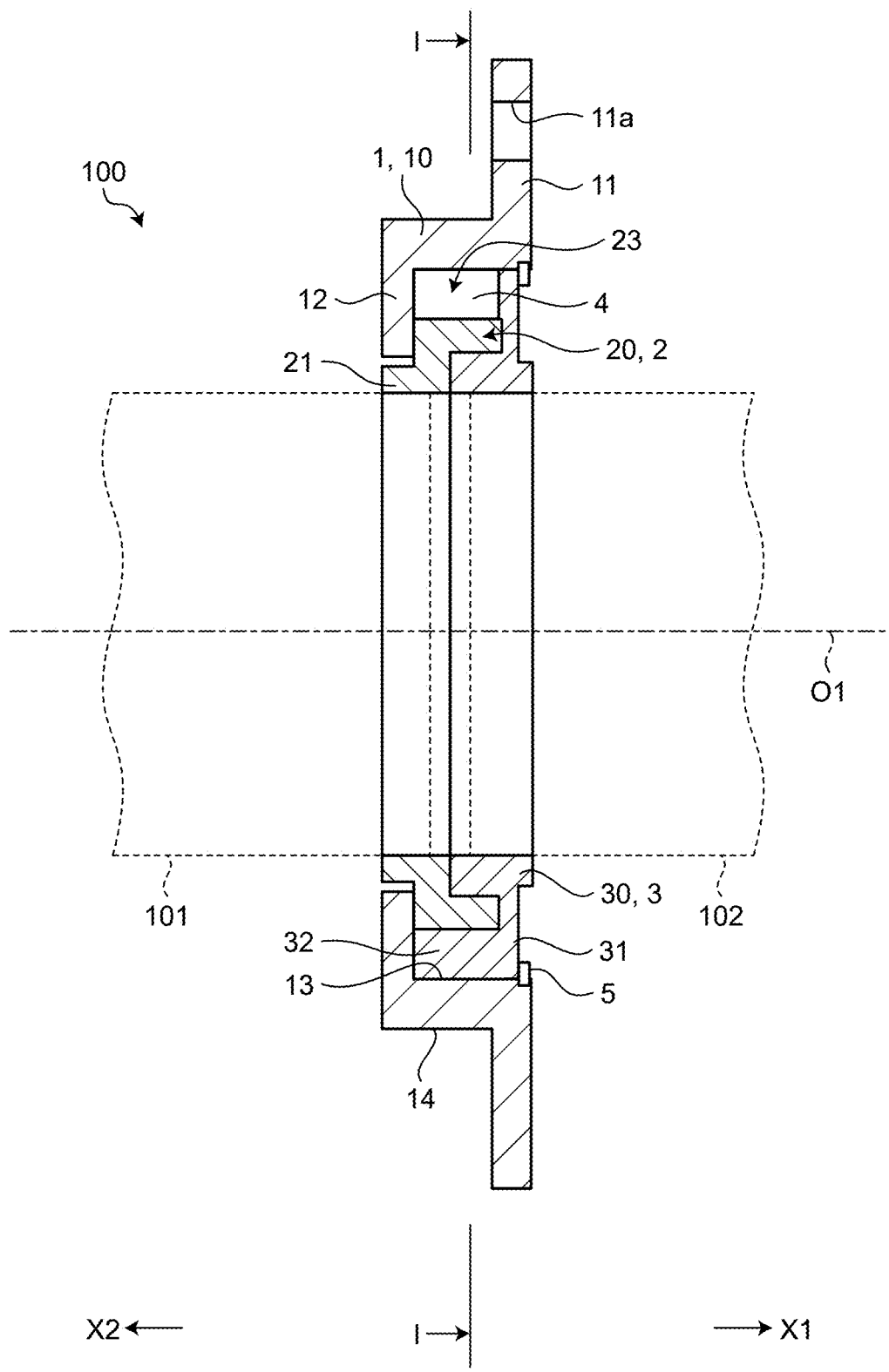
FIG. 2 is a cross-sectional view of the power transmission device according to the first embodiment taken along the axial direction, and is specifically a cross-sectional view taken along line II-II in FIG. 1.
Figure 3:
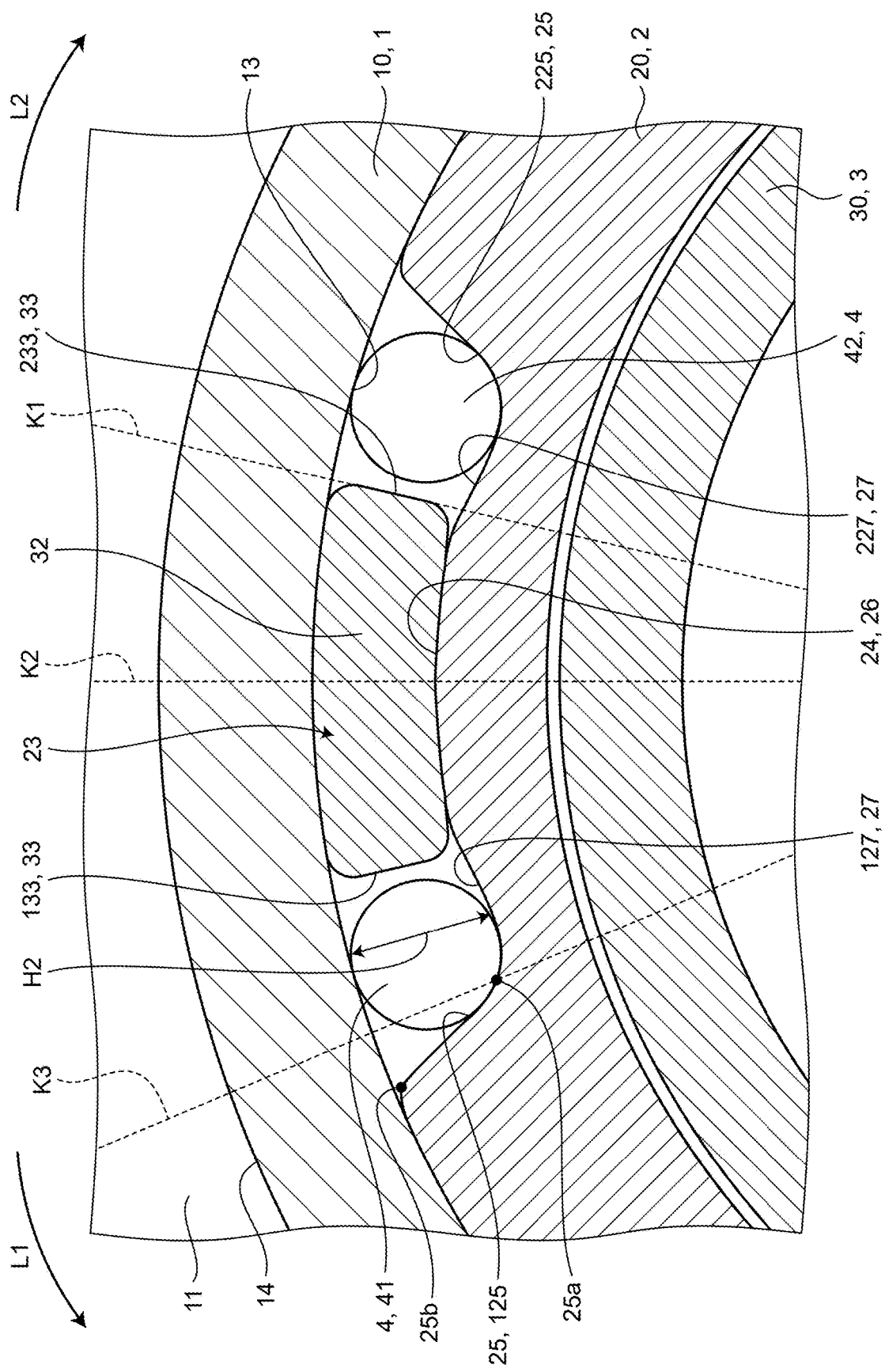
FIG. 3 is an enlarged view in which a recessed surface of FIG. 1 is enlarged.

FIG. 1 is a cross-sectional view of a power transmission device according to a first embodiment taken in a direction orthogonal to an axial direction, and is specifically a cross-sectional view taken along line I-I in FIG. 2. FIG. 2 is a cross-sectional view of the power transmission device according to the first embodiment taken along the axial direction, and is specifically a cross-sectional view taken along line II-II in FIG. 1. FIG. 3 is an enlarged view in which a recessed surface of FIG. 1 is enlarged.

As illustrated in FIG. 1, a power transmission device 100 according to the first embodiment includes a fixing member 1, an output shaft 2, an input shaft 3, and a plurality of cylindrical rollers (rolling elements) 4.

The fixing member 1 is a component for fixing the power transmission device 100 to another component. As illustrated in FIG. 2, the fixing member 1 includes an outer ring portion 10, an outer flange portion 11 protruding from the outer ring portion 10 to the outer circumferential side, and an inner flange portion 12 protruding from the outer ring portion 10 to the inner circumferential side. As illustrated in FIG. 1, the outer ring portion 10 is formed in an annular shape. An inner circumferential surface 13 and an outer circumferential surface 14 of the outer ring portion 10 are formed in a circular shape around a center line O1. That is, the outer ring portion 10 is formed in a cylindrical shape. Hereinafter, the inner circumferential surface 13 may be referred to as a cylindrical surface. A direction parallel to the center line O1 of the inner circumferential surface 13 is referred to as an axial direction. A direction orthogonal to the center line O1 is referred to as a radial direction. A direction around the center line O1 is referred to as a circumferential direction.

Each of the outer flange portion 11 and the inner flange portion 12 extends in the circumferential direction along the outer ring portion 10 so as to form an annular shape. The outer flange portion 11 has a through hole 11a provided to penetrate the outer flange portion in the axial direction. A shaft portion of a bolt (not illustrated) is inserted into the through hole 11a. The outer flange portion 11 is tightened by a head portion of a bolt (not illustrated). This fixes the fixing member 1 to another device.

As illustrated in FIG. 2, the outer flange portion 11 is provided at one end of the outer ring portion 10 in the axial direction. The inner flange portion 12 is provided at the other end of the outer ring portion 10 in the axial direction. Hereinafter, in the axial direction, a direction in which the outer flange portion 11 is disposed as viewed from the inner flange portion 12 is denoted as a first direction X1, and its opposite direction is denoted as a second direction X2. As illustrated in FIG. 1, description regarding the circumferential direction will be given based on a case viewed in the second direction X2. A counterclockwise direction as viewed in the second direction X2 is denoted as a first rotational direction L1. A clockwise direction as viewed in the second direction X2 is denoted as a second rotational direction L2.

As illustrated in FIG. 2, the output shaft 2 includes: an inner ring portion 20 having an annular shape and disposed on the inner circumferential side of the outer ring portion 10; and a first connecting portion 21 having an annular shape and provided on the inner circumferential side of the inner ring portion 20.

As illustrated in FIG. 1, an outer circumferential surface 22 of the inner ring portion 20 is a facing surface that faces the inner circumferential surface 13 of the outer ring portion 10. Note that the outer circumferential surface 22 may be denoted as the facing surface. The outer diameter of the outer circumferential surface 22 is substantially the same as the diameter of the inner circumferential surface 13 of the outer ring portion 10. The outer circumferential surface 22 of the inner ring portion 20 is in contact with the inner circumferential surface 13 of the outer ring portion 10 so as to be slidable in the circumferential direction. With this configuration, the output shaft 2 is disposed coaxially with the center line O1 of the fixing member 1 and is rotatably supported by the fixing member 1.

The outer circumferential surface 22 of the inner ring portion 20 has recessed surfaces 23 recessed inward in the radial direction. In the present embodiment, the number of the recessed surfaces 23 are six. The six recessed surfaces 23 are disposed at equal intervals in the circumferential direction. One recessed surface 23 includes a pressing portion 32, which will be described below, of the input shaft 3 and two cylindrical rollers 4. The recessed surface 23 will be described below in detail.

As illustrated in FIG. 2, the inner flange portion 12 is disposed in the second direction X2 of the inner ring portion 20. This prevents the output shaft 2 from falling off from the fixing member 1 in the second direction X2. The inside of the recessed surface 23 is covered with the inner flange portion 12 from the second direction X2. This prevents the cylindrical rollers 4 from falling off from the inside of the recessed surface 23 in the second direction X2.

An outer diameter of the first connecting portion 21 is smaller than an inner diameter of the inner flange portion 12. That is, the first connecting portion 21 is disposed on the inner circumferential side of the inner flange portion 12. The inner circumferential surface of the first connecting portion 21 is a fitting surface to which another component 101 that transmits torque from the power transmission device 100 (output shaft 2) is to be fitted.

The input shaft 3 includes: a second connecting portion 30 disposed in the first direction X1 of the first connecting portion 21; a main body 31 extending outward from the second connecting portion 30 in the radial direction; and a plurality of pressing portions 32 protruding from the main body 31 in the second direction X2.

As illustrated in FIG. 1, the second connecting portion 30 is formed in an annular shape. The inner diameter and the outer diameter of the second connecting portion 30 are the same as those of the first connecting portion 21. The inner circumferential surface of the second connecting portion 30 is a fitting surface to which another component 102 that transmits torque to the power transmission device 100 (input shaft 3) is to be fitted.

The main body 31 extends in the circumferential direction along the outer circumferential surface of the second connecting portion 30 and has an annular shape. As illustrated in FIG. 2, the outer diameter of the main body 31 is substantially the same as the diameter of the inner circumferential surface 13 of the outer ring portion 10. The outer circumferential surface of the main body 31 is in contact with the inner circumferential surface 13 of the outer ring portion 10 so as to be slidable in the circumferential direction. With this configuration, the input shaft 3 is disposed coaxially with the center line O1 of the outer ring portion 10 and is rotatably supported by the fixing member 1.

The inner ring portion 20 of the output shaft 2 is disposed in the second direction X2 of the main body 31. The main body 31 covers the inside of the recessed surface 23 from the first direction X1. This prevents the cylindrical rollers 4 from falling off from the inside of the recessed surface 23 in the first direction X1. There is provided a retaining ring 5 on the inner circumferential surface 13 of the outer ring portion 10 at the end in the first direction X1. The retaining ring 5 is in contact with the main body 31 from the first direction X1. This prevents the input shaft 3 and the output shaft 2 from falling off from the fixing member 1 in the first direction X1.

As illustrated in FIG. 1, the pressing portion 32 is formed in an arc shape when viewed in the axial direction. The pressing portion 32 is disposed inside the recessed surface 23. The surface of the pressing portion 32 in the circumferential direction is a pressing surface 33. The pressing surface 33 extends along an imaginary line K1 (refer to FIG. 3) extending in the radial direction from the center line O1. Regarding the pressing surface 33, the pressing portion 32 has two pressing surfaces, namely, a first pressing surface 133 facing the first rotational direction L1 and a second pressing surface 233 facing the second rotational direction L2.

The cylindrical rollers 4 are formed in a columnar shape and have a diameter H1 (refer to FIG. 1). The cylindrical roller 4 is formed of a steel material and thus is a rigid body that does not easily deform. Two cylindrical rollers 4 are disposed inside one recessed surface 23. The two cylindrical rollers 4 are disposed separately on either side of the pressing portion 32 in the circumferential direction. Hereinafter, the cylindrical rollers 4 disposed in the first rotational direction L1 as viewed from the pressing portion 32 are denoted as first cylindrical rollers 41, while the cylindrical rollers 4 disposed in the second rotational direction L2 are denoted as second cylindrical rollers 42.

Next, details of the recessed surface 23 will be described with reference to FIG. 3. As illustrated in FIG. 3, the recessed surface 23 is formed to be symmetrical with respect to an imaginary line K2 passing through the central portion of a bottom surface 24 in the circumferential direction from the center line O1. The recessed surface 23 has a bottom surface 24 and two pressed surfaces 25.

The bottom surface 24 has a central surface 26 located at a central portion of the bottom surface 24 in the circumferential direction and a pair of cam surfaces 27 located at ends of the bottom surface 24 in the circumferential direction. The direction in which the pressed surface 25 is disposed as viewed from the central surface 26 is denoted as an outside in the circumferential direction. In addition, a direction in which the central surface 26 is disposed as viewed from the pressed surface 25 is denoted as an inside in the circumferential direction.

The central surface 26 is formed in an arc shape. The pressing portion 32 of the input shaft 3 is disposed between the central surface 26 and the outer ring portion 10.

The pair of cam surfaces 27 includes: a first cam surface 127 disposed in the first rotational direction L1; and a second cam surface 227 disposed in the second rotational direction L2, with the directions being defined with respect to the central surface 26. The first cam surface 127 and the second cam surface 227 are symmetrical with respect to the imaginary line K2. Therefore, in the description of the cam surface 27, the first cam surface 127 will be described as a representative example, and the description of the second cam surface 227 will be omitted.

The first cylindrical rollers 41 are disposed between the first cam surface 127 and the inner circumferential surface 13 of the outer ring portion 10. The diameter from the center line O1 to the cam surface 27 is formed so as to gradually decrease from the central surface 26 toward the pressed surface 25. That is, a distance H2 between the inner circumferential surface 13 of the outer ring portion 10 and the cam surface 27 gradually increases toward the pressed surface 25.

Moreover, the distance H2 between the inner circumferential surface 13 and the cam surface 27 is equal to a diameter H1 (refer to FIG. 1) of the first cylindrical roller 41 at the central portion of the cam surface 27 in the circumferential direction. Accordingly, when the first cylindrical roller 41 moves toward the central surface 26, the first cylindrical roller 41 is caught between the cam surface 27 and the inner circumferential surface 13. On the other hand, when the first cylindrical roller 41 moves toward the pressed surface 25, the first cylindrical roller 41 is loosely fitted with clearance without being caught between the cam surface 27 and the inner circumferential surface 13.

The pressed surface 25 extends outward in the radial direction from the end of the bottom surface 24 in the circumferential direction. The two pressed surfaces 25 include: a first pressed surface 125 disposed in the first rotational direction L1; and a second pressed surface 225 disposed in the second rotational direction L2, with the directions being defined with respect to the central surface 26.

The first pressed surface 125 has a proximal end 25a and a distal end 25b. The proximal end 25a is located at the inner end of the first pressed surface 125 in the radial direction (one end in the radial direction) and joins the end of the bottom surface 24 in the circumferential direction. The distal end 25b is located at the outer end of the first pressed surface 125 in the radial direction (the other end in the radial direction).

A straight line drawn from the center line O1 to the proximal end 25a of the first pressed surface 125 is defined as an imaginary line K3. The first pressed surface 125 (pressed surface 25) is tilted outward in the circumferential direction with respect to the imaginary line K3. That is, the distal end 25b is disposed on the outer side of the imaginary line K3 in the circumferential direction, with the first pressed surface 125 (pressed surface 25) inclined outward in the circumferential direction. That is, the pressed surface 25 is disposed so as to be positioned more outward in the circumferential direction from the proximal end 25a toward the distal end 25b and inclined toward outside in the circumferential direction. Since the second pressed surface 225 is bilaterally symmetrical with the first pressed surface 125 with respect to the imaginary line K2, the description of the second pressed surface 225 is omitted.

Figure 4:
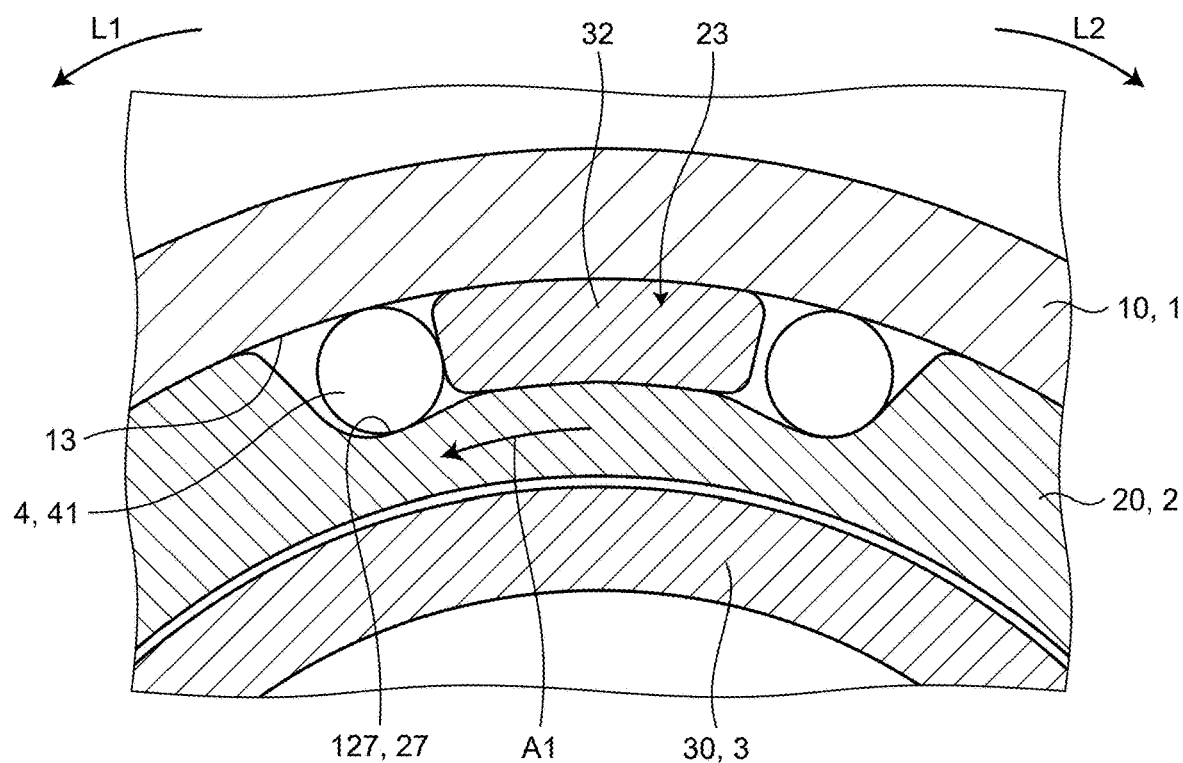
FIG. 4 is an enlarged view of the recessed surface when an external force in a first rotational direction is input to an output shaft of the first embodiment.
Figure 5:
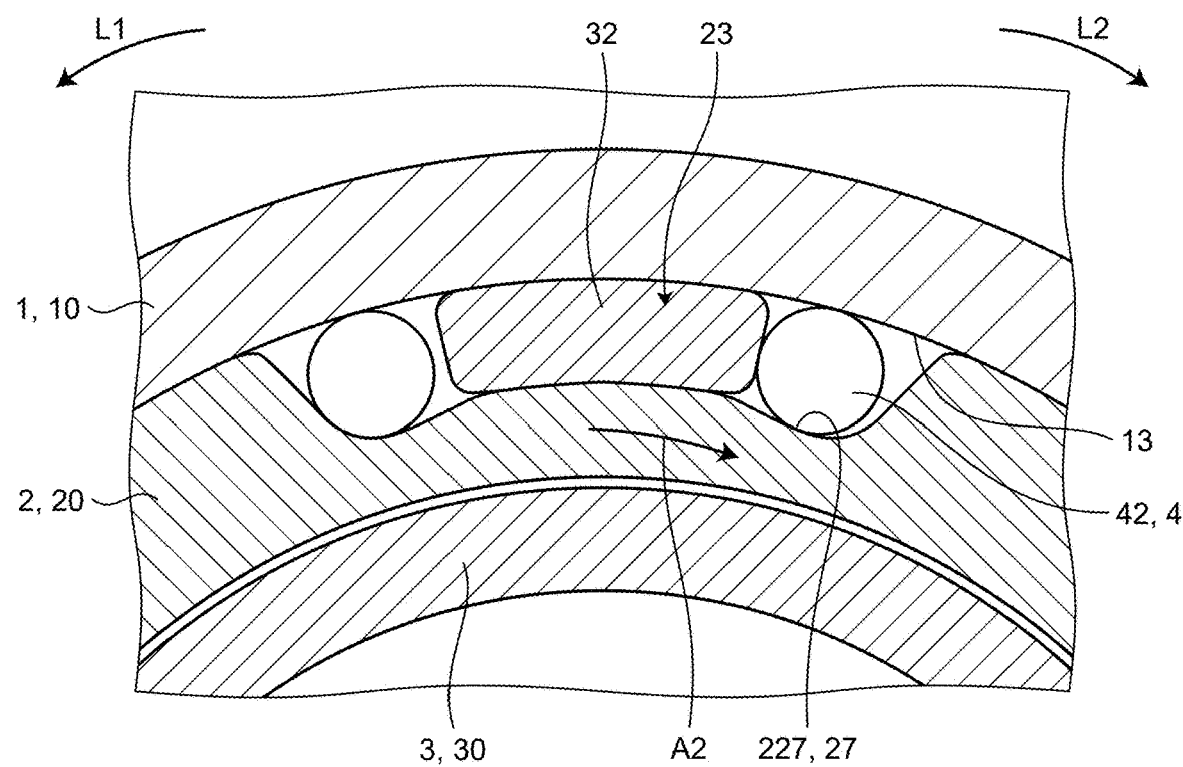
FIG. 5 is an enlarged view of the recessed surface when an external force in a second rotational direction is input to the output shaft of the first embodiment.
Figure 6:
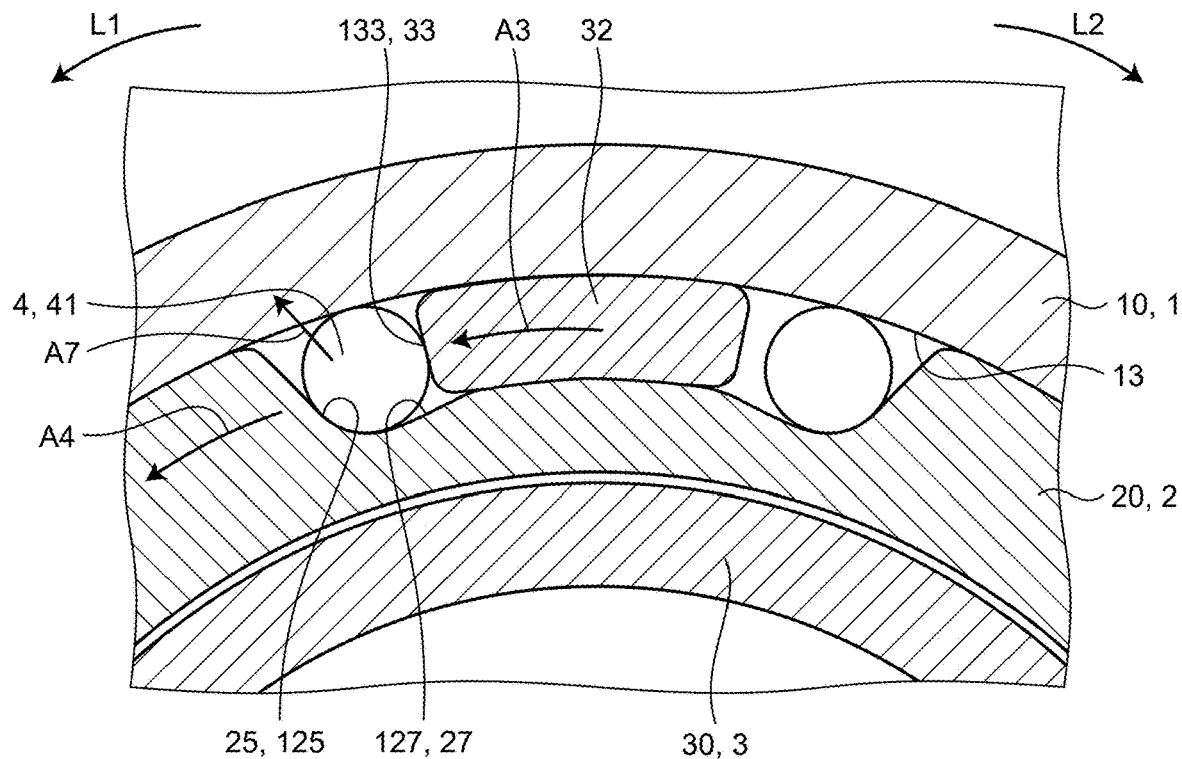
FIG. 6 is an enlarged view of a recessed surface when torque in the first rotational direction is input to an input shaft of the first embodiment.
Figure 7:
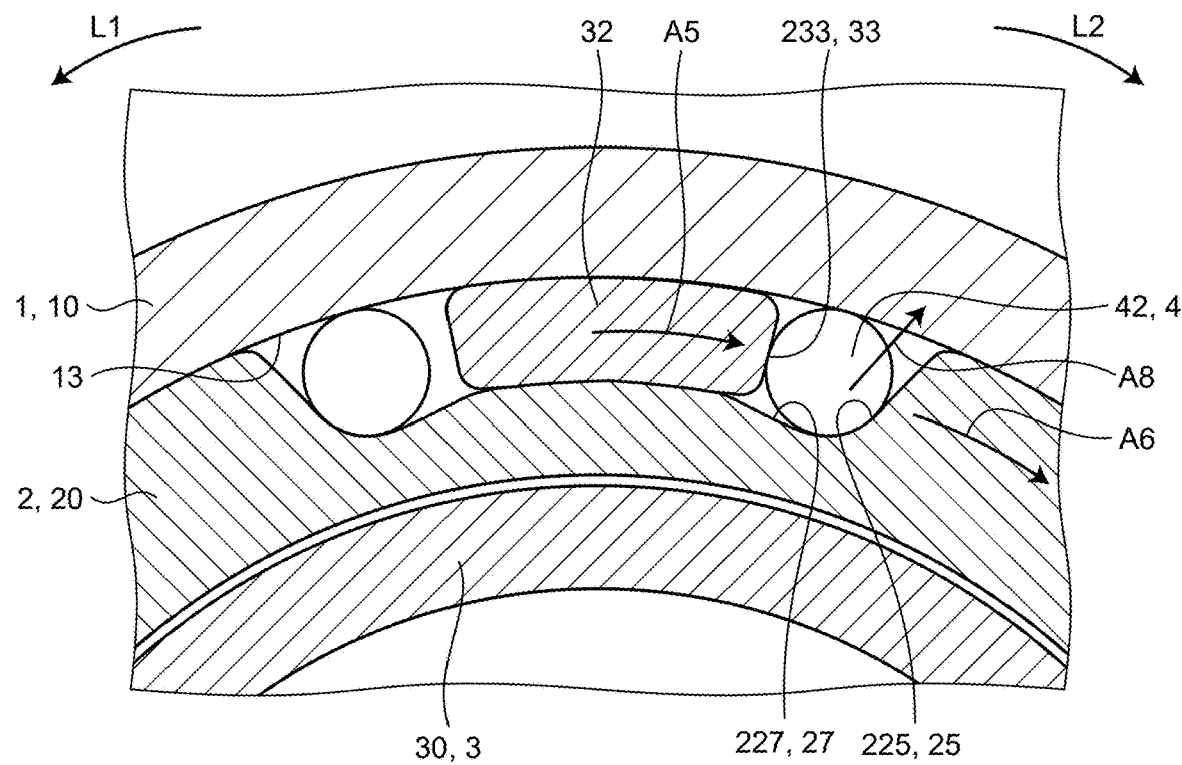
FIG. 7 is an enlarged view of a recessed surface when torque in the second rotational direction is input to the input shaft of the first embodiment.

FIG. 4 is an enlarged view of a recessed surface when an external force in a first rotational direction is input to an output shaft of the first embodiment. FIG. 5 is an enlarged view of a recessed surface when an external force in a second rotational direction is input to an output shaft of the first embodiment. FIG. 6 is an enlarged view of a recessed surface when torque in the first rotational direction is input to an input shaft of the first embodiment. FIG. 7 is an enlarged view of a recessed surface when torque in the second rotational direction is input to the input shaft of the first embodiment.

Next, the operation of the power transmission device according to the first embodiment will be described with reference to FIGS. 3 to 7. In the following description, the torque that is input to the output shaft 2 from the another component 101 (refer to FIG. 2) is referred to as an external force, and is distinguished from the torque that is input to the input shaft 3 from the another component 102 (refer to FIG. 2).

First, a state of the power transmission device 100 illustrated in FIG. 3 will be described. As illustrated in FIG. 3, the two cylindrical rollers 4 are disposed closer to the pressed surface 25 in the cam surface 27.

Therefore, the two cylindrical rollers 4 are loosely fitted with clearance without being caught between the cam surface 27 and the inner circumferential surface 13. Accordingly, the output shaft 2 is rotatable, and this state is hereinafter referred to as a neutral state.

When the external force in the first rotational direction L1 is input to the output shaft 2 in the neutral state, the output shaft 2 rotates in the first rotational direction L1 as illustrated in FIG. 4 (refer to arrow A1 in FIG. 4). As a result, the first cylindrical roller 41 is caught between the inner circumferential surface 13 and the first cam surface 127. This restricts the rotation of the output shaft 2 in the first rotational direction L1.

On the other hand, when an external force in the second rotational direction L2 is input to the output shaft 2 in the neutral state, the output shaft 2 rotates in the second rotational direction L2 as illustrated in FIG. 5 (refer to arrow A2 in FIG. 5). As a result, the second cylindrical roller 42 is caught between the inner circumferential surface 13 and the second cam surface 227. This restricts the rotation of the output shaft 2 in the second rotational direction L2.

When the torque in the first rotational direction L1 is input to the input shaft 3 in a state where the rotation of the output shaft 2 in the first rotational direction L1 is restricted as illustrated in FIG. 4, the pressing portion 32 moves in the first rotational direction L1 as illustrated in FIG. 6 (refer to arrow A3 in FIG. 6). The first pressing surface 133 of the pressing portion 32 presses the first cylindrical roller 41 in the first rotational direction L1. The movement of the first cylindrical roller 41 in the first rotational direction L1 will cancel the state in which the first cylindrical roller 41 is caught between the inner circumferential surface 13 and the first cam surface 127, that is, the state of restricting the rotation of the output shaft 2 in the first rotational direction L1.

When the pressing portion 32 further moves in the first rotational direction L1, the first cylindrical roller 41 comes into contact with the first pressed surface 125. The pressing portion 32 then presses the first pressed surface 125 via the first cylindrical roller 41 (refer to arrow A4 in FIG. 6). This transmits the torque in the first rotational direction L1 to the output shaft 2, allowing the output shaft 2 to rotate in the first rotational direction L1.

On the other hand, when the torque in the second rotational direction L2 is input to the input shaft 3 in a state where the rotation of the output shaft 2 in the first rotational direction L1 is restricted as illustrated in FIG. 4, the pressing portion 32 moves in the second rotational direction L2 as illustrated in FIG. 7 (refer to arrow A5 in FIG. 7). When the second pressing surface 233 of the pressing portion 32 comes into contact with the second cylindrical rollers 42, the pressing portion 32 presses the second pressed surface 225 via the second cylindrical rollers 42 (refer to arrow A6 in FIG. 7). This transmits the torque in the second rotational direction L2 to the output shaft 2, allowing the output shaft 2 to rotate in the second rotational direction L2.

In addition, when the output shaft 2 starts to rotate in the second rotational direction L2, the first cam surface 127 moves in the second rotational direction L2 with respect to the first cylindrical roller 41. This cancels the state in which the first cylindrical roller 41 is caught between the inner circumferential surface 13 and the first cam surface 127.

In the operation example described above, when rotating the output shaft 2 in the second rotational direction L2 from a state in which the rotation of the output shaft 2 in the first rotational direction L1 is restricted, the torque in the second rotational direction L2 is input to the input shaft 3 as illustrated in FIG. 7. However, the present disclosure is not limited to this operation example. In the above operation method, when the pressing portion 32 starts to press the second pressed surface 225 via the second cylindrical rollers 42, the first cylindrical roller 41 is caught between the inner circumferential surface 13 and the first cam surface 127. That is, there is a possibility that the output shaft 2 does not rotate smoothly. Therefore, it is also allowable to configure such that, after the input shaft 3 is once rotated in the first rotational direction L1 to cancel the state in which the first cylindrical rollers 41 are caught between the inner circumferential surface 13 and the first cam surface 127, the input shaft 3 is to be rotated in the second rotational direction L2 to transmit torque to the output shaft 2.

In addition, the output shaft 2, the input shaft 3, and the cylindrical rollers 4 rotate relative to the inner circumferential surface 13 of the fixing member 1, with an oil film having a constant thickness being formed on the inner circumferential surface 13 of the fixing member 1. In addition, when an external force (refer to arrow A1 in FIG. 4 and arrow A2 in FIG. 5) is input to the output shaft 2 when the power transmission device 100 is stopped, the cylindrical rollers 4 are caught between the inner circumferential surface 13 of the fixing member 1 and the cam surface 27 as described above, restricting the rotation of the output shaft 2. Here, there is an oil film between the inner circumferential surface 13 of the fixing member 1 and the cylindrical rollers 4, it is necessary for the cylindrical rollers 4 to shear the oil film in order to lock the output shaft 2. When the oil film between the inner circumferential surface 13 and the cylindrical rollers 4 is too thick, there is a possibility that the cylindrical rollers 4 cannot easily shear the oil film, leading to a failure in locking the output shaft 2.

In this regard, the pressed surface 25 of the present embodiment is tilted outward in the circumferential direction with respect to the imaginary line K3. That is, when the pressing portion 32 presses the pressed surface 25 via the cylindrical roller 4, the cylindrical roller 4 is pressed against the pressed surface 25 and moves toward the distal end 25b (outside in the radial direction) of the pressed surface 25 (refer to arrow A7 in FIG. 6 and arrow A8 in FIG. 7). This reduces the clearance between the inner circumferential surface 13 of the fixing member 1 and the first cylindrical rollers 41, leading to the reduced thickness of the oil film interposed between the inner circumferential surface 13 and the cylindrical roller 4. As a result, when an external force (refer to arrow A1 in FIG. 4 and arrow A2 in FIG. 5) is input to the output shaft 2 when the power transmission device 100 is stopped, the cylindrical rollers 4 easily shear the oil film interposed between the inner circumferential surfaces 13, making it possible to reliably lock the output shaft 2. That is, the present embodiment can achieve high reliability in locking the output shaft 2.

As described above, the power transmission device 100 according to the first embodiment includes: the fixing member 1 having the cylindrical surface (inner circumferential surface 13) facing inward in the radial direction; the output shaft 2 having the facing surface (outer circumferential surface 22) facing the cylindrical surface; the input shaft 3 having the at least one or more pressing portion 32 disposed between the cylindrical surface and the facing surface; and the pair of rolling elements (cylindrical rollers 4) disposed on either side of the pressing portion in the circumferential direction between the cylindrical surface and the facing surface. The facing surface includes the recessed surface 23 recessed in the radial direction and accommodating the pressing portion 32 and the pair of rolling elements. The recessed surface 23 has the bottom surface 24 and the pair of pressed surfaces 25 extending in the radial direction from the end of the bottom surface 24 in the circumferential direction and facing the circumferential direction. The surface of the pressing portion 32 in the circumferential direction is the pressing surface 33 that presses the pressed surface 25 via the rolling element. The bottom surface 24 includes: the central surface 26 which is located at the central portion of the recessed surface 23 in the circumferential direction, with the pressing portion being disposed between the central surface 26 and the cylindrical surface; and the pair of cam surfaces 27 which is located on either side of the recessed surface 23 in the circumferential direction, with the rolling element being disposed between the cam surface 27 and the cylindrical surface. The distance H2 between the cam surface 27 and the cylindrical surface gradually increases from the central surface 26 toward the pressed surface 25. The portion of the cam surface 27 closer the central surface 26 has the distance H2 smaller than the diameter H1 of the rolling element. The portion of the cam surface 27 closer to the pressed surface 25 has the distance H2 greater than the diameter H1 of the rolling element.

According to the first embodiment described above, the torque of the input shaft 3 is transmitted to the output shaft 2 via the cylindrical roller 4 which is a rigid body. The cylindrical roller 4 is a rigid body and has a small amount of deformation when subjected to action of torque. This achieves reduction of torque loss. Furthermore, the rotation of the output shaft 2 is restricted, making it possible to retain the position of another component 101 (for example, an arm of an industrial robot) connected to the output shaft 2. In addition, it is not necessary to control devices such as a motor to restrict the rotation of the output shaft, making it possible to reduce the power consumption of the facility in which the power transmission device 100 is installed. Furthermore, although the technique of JP 2015-206455 A described above needs the flange plate and the unlocking plate in addition to the output shaft and the input shaft, the power transmission device 100 needs no flange plate or the unlocking plate. This makes it possible to reduce the number of components of the power transmission device 100.

The first embodiment has been described above. Although the first embodiment describes an example in which cylindrical rollers are used as rolling elements, it is allowable, in the present disclosure, to use balls with no particular limitation. Next, a modification obtained by modifying the first embodiment will be described. In the following description, only differences from the power transmission device described above will be described.

First Modification

Figure 8:
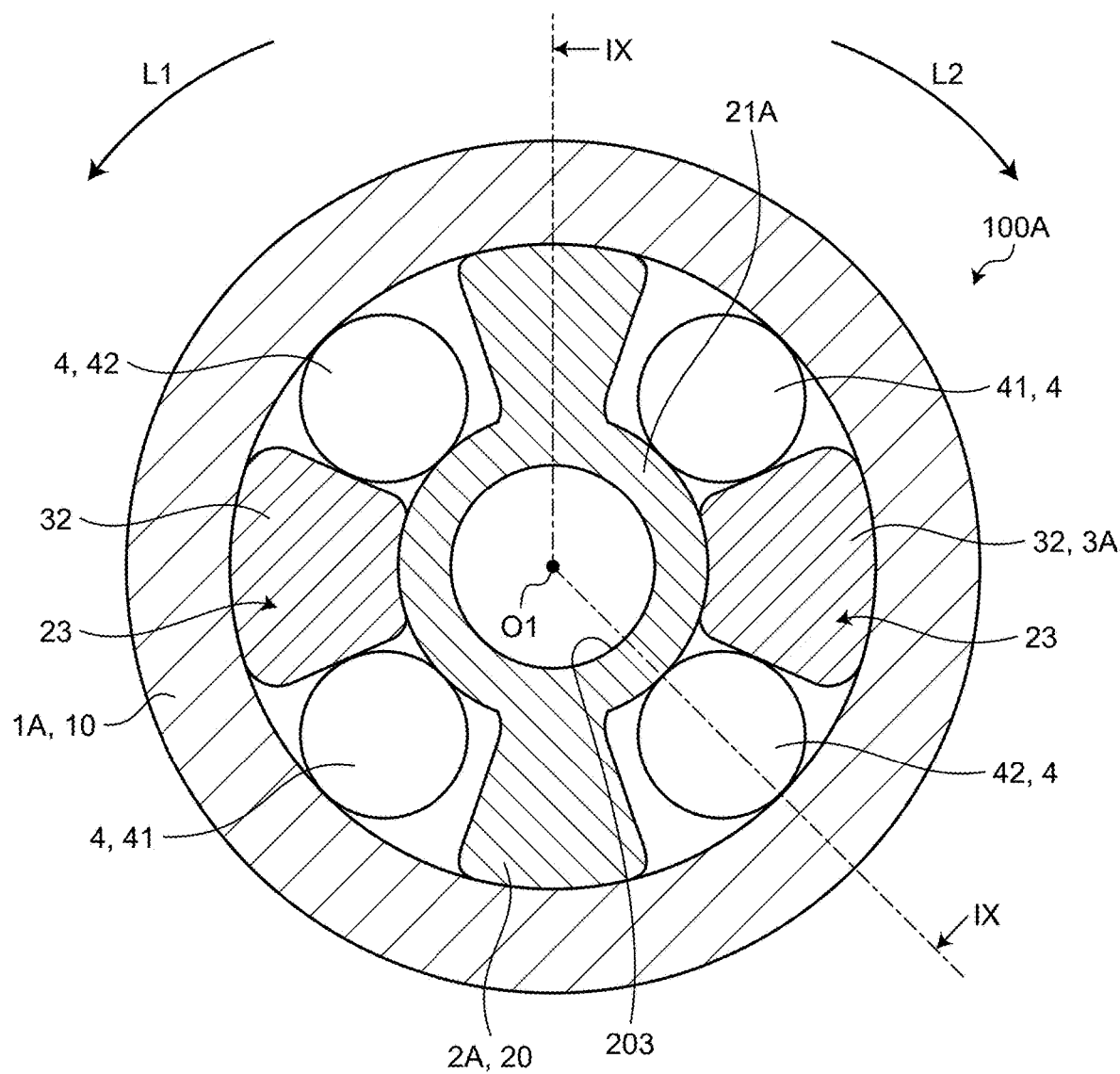
FIG. 8 is a cross-sectional view of the power transmission device of a first modification taken along a direction orthogonal to the axial direction, and specifically is a cross-sectional view taken along line VIII-VIII in FIG. 9.
Figure 9:
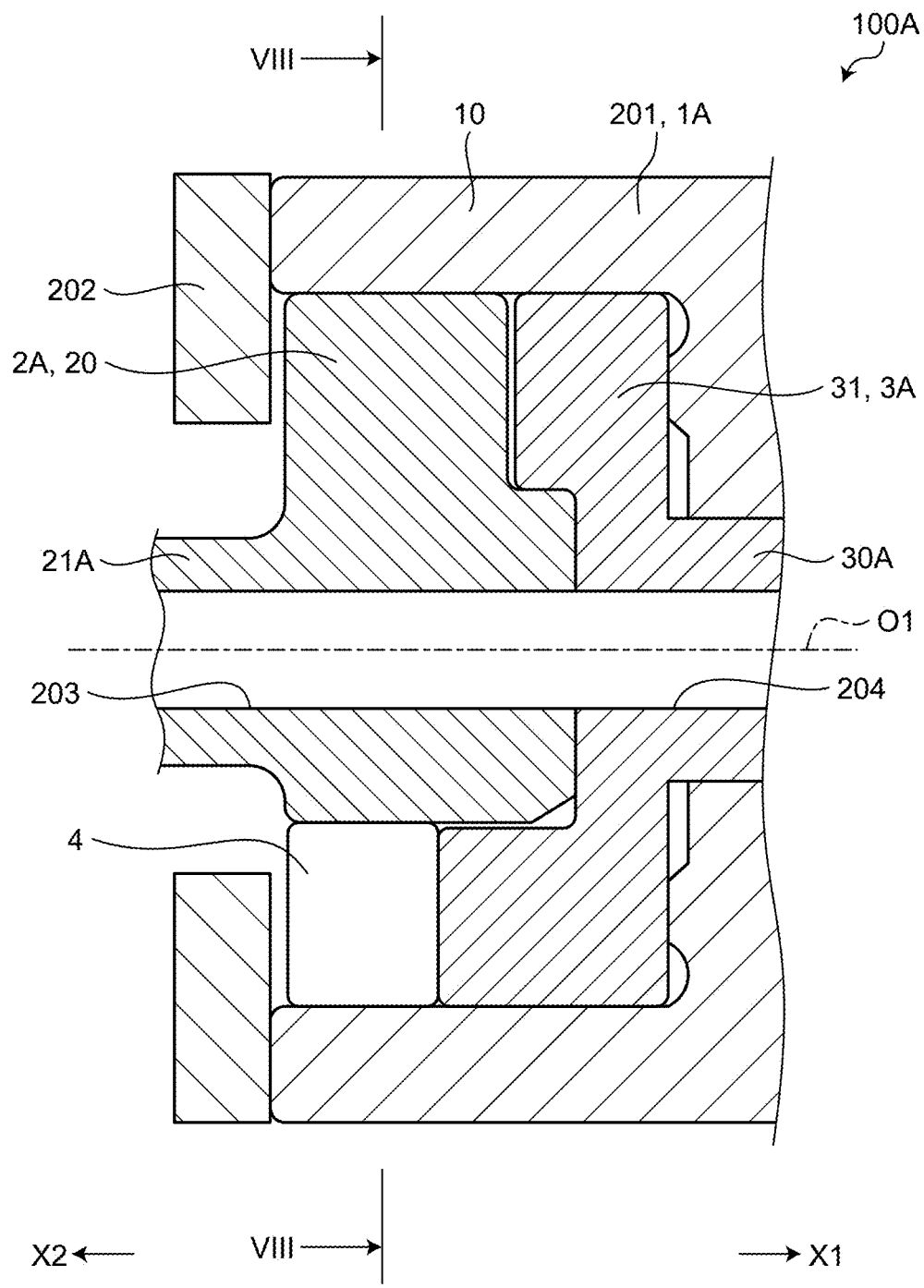
FIG. 9 is a cross-sectional view of the power transmission device of the first modification taken along the axial direction, and specifically is a cross-sectional view taken along line IX-IX in FIG. 8.

FIG. 8 is a cross-sectional view of the power transmission device of a first modification taken along a direction orthogonal to the axial direction, and specifically is a cross-sectional view taken along line VIII-VIII in FIG. 9. FIG. 9 is a cross-sectional view of the power transmission device of the first modification taken along the axial direction, and specifically is a cross-sectional view taken along line IX-IX in FIG. 8.

As illustrated in FIG. 8, a power transmission device 100A according to a first modification is different from the device of the first embodiment in that the number of recessed surfaces 23 is two. Even with such a power transmission device 100A, the same effects as those of the first embodiment can be obtained, and the torque loss can be reduced. In this manner, the number of recessed surfaces 23 of the present disclosure is not limited to six as described in the first embodiment. That is, it is sufficient for the power transmission device of the present disclosure to have at least one or more recessed surface 23, with no particular limitation of the number of recessed surfaces 23.

As illustrated in FIG. 9, a fixing member 1A is different from that of the first embodiment in that the fixing member 1A is formed of components divided into two in the axial direction. Specifically, the fixing member 1A includes a first fixing member 201 and a second fixing member 202, with the second fixing member 202 being disposed in the second direction X2 of the first fixing member 201. The first fixing member 201 and the second fixing member 202 are integrated to each other by a bolt (not illustrated) tightened in the axial direction. In this manner, the fixing member of the present disclosure may include two or more components, and is not limited to the shape described in the first embodiment.

An output shaft 2A of the first modification is different from that of the first embodiment in including a first connecting shaft 21A having a shaft shape instead of the first connecting portion 21 (refer to FIG. 2). Similarly, an input shaft 3A of the first modification is different from that of the first embodiment in including a second connecting shaft 30A having a shaft shape instead of the second connecting portion 30 (refer to FIG. 2). In addition, through holes 203 and 204 extending in the axial direction are formed in the first connecting shaft 21A and the second connecting shaft 30A, respectively. Wiring lines and the like are disposed in the through holes 203 and 204. In this manner, the output shaft and the input shaft of the present disclosure are not limited to the shapes described in the first embodiment.

Second Modification

Figure 10:
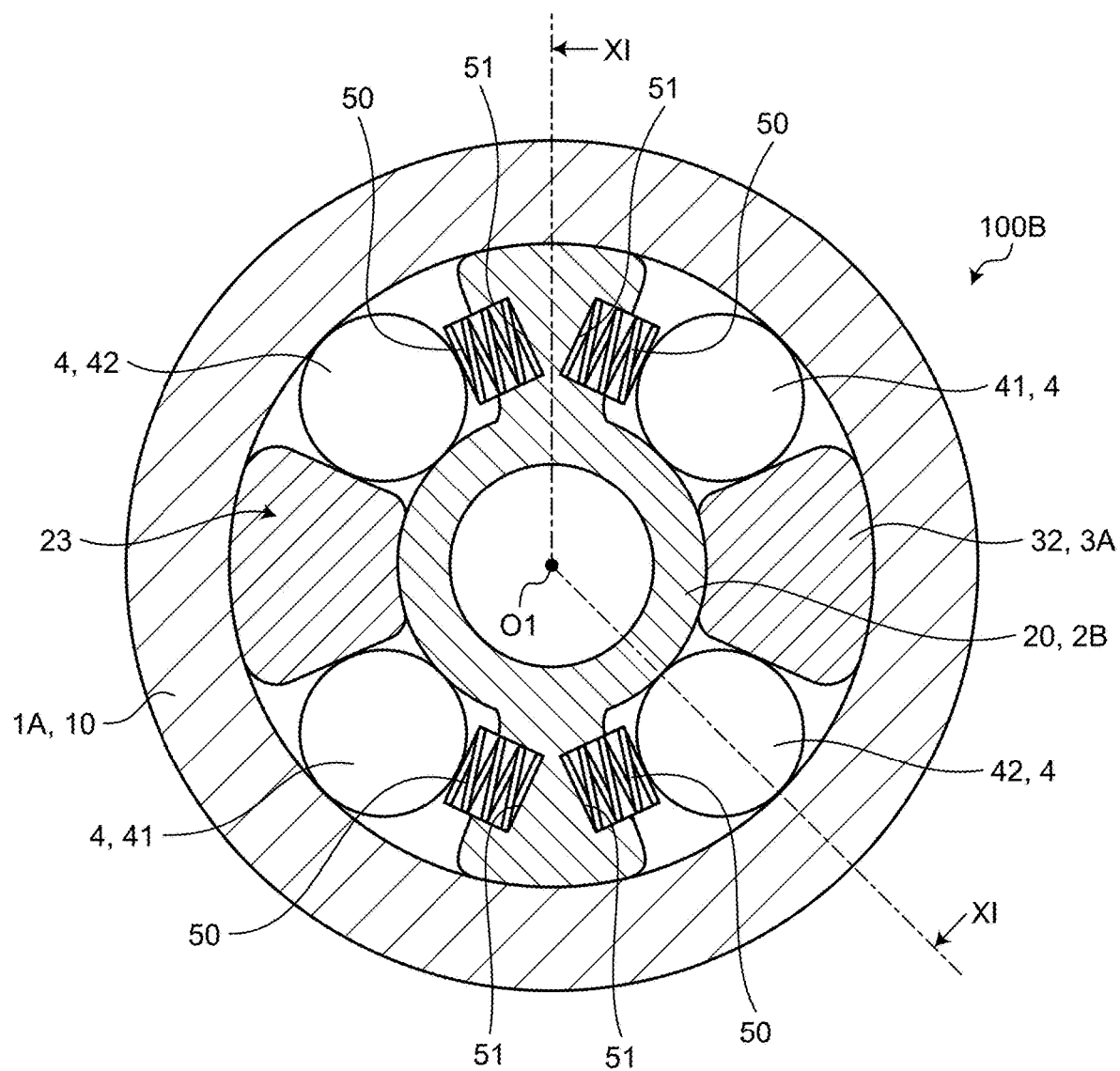
FIG. 10 is a cross-sectional view of a power transmission device according to a second modification taken in a direction orthogonal to the axial direction, and specifically is a cross-sectional view taken along line X-X in FIG. 11.
Figure 11:
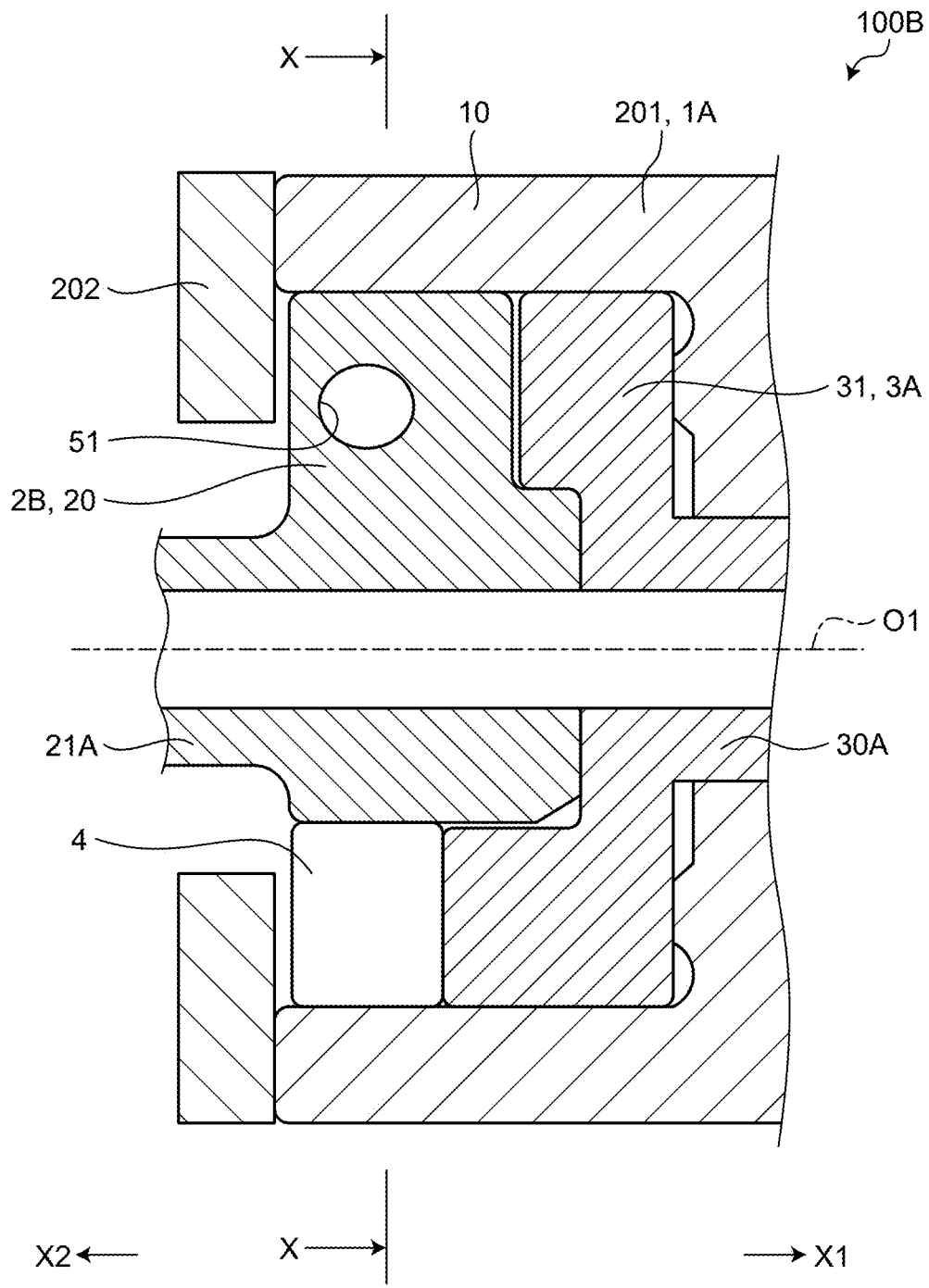
FIG. 11 is a cross-sectional view of the power transmission device of the second modification taken along the axial direction, and specifically is a cross-sectional view taken along line XI-XI in FIG. 10.
Figure 12:
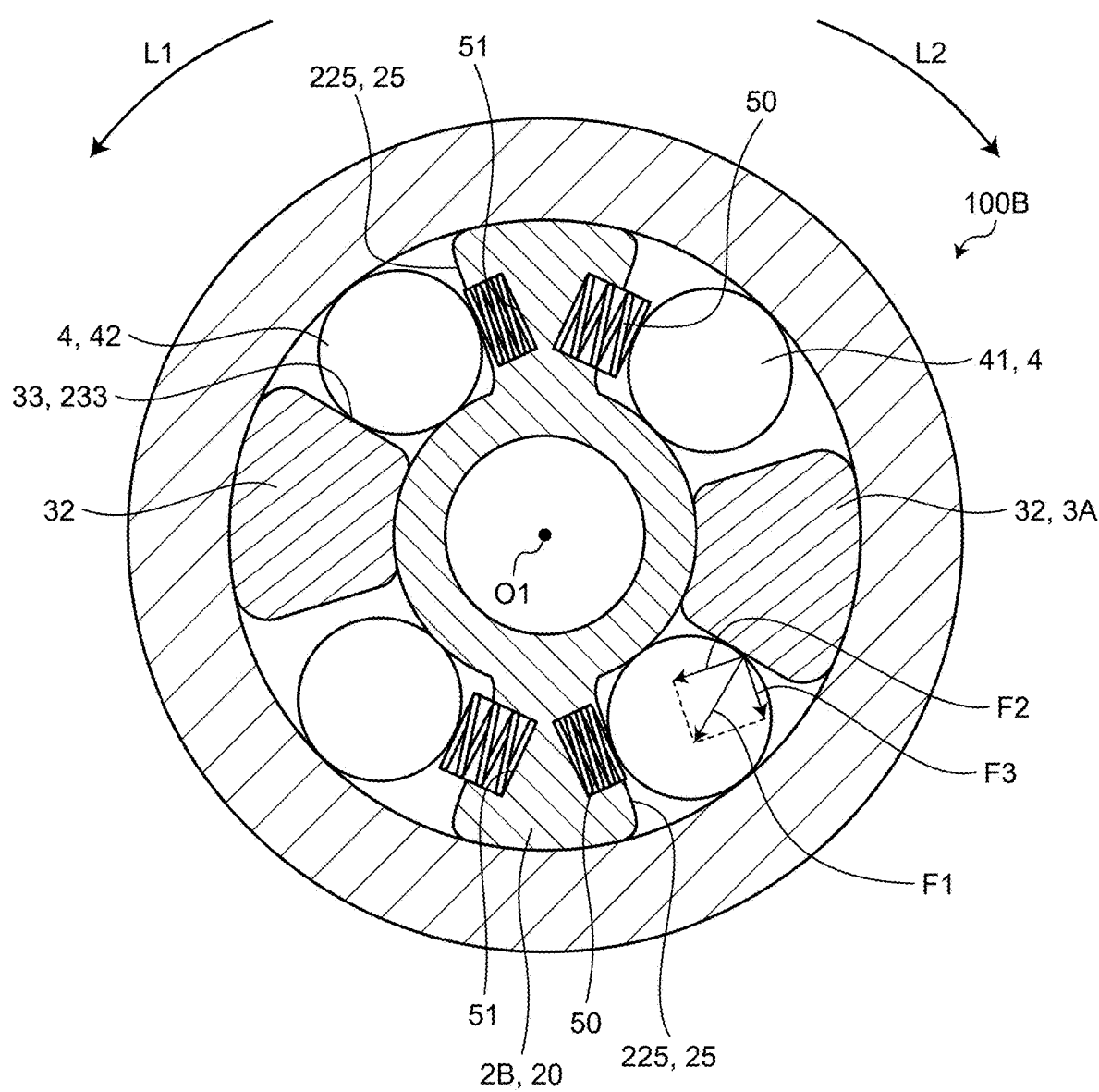
FIG. 12 is a diagram when torque in the first rotational direction is input to an input shaft in the power transmission device of the second modification.

FIG. 10 is a cross-sectional view of a power transmission device according to a second modification taken in a direction orthogonal to the axial direction, and is specifically a cross-sectional view taken along line X-X in FIG. 11. FIG. 11 is a cross-sectional view of the power transmission device of the second modification taken along the axial direction, and specifically is a cross-sectional view taken along line XI-XI in FIG. 10. FIG. 12 is a diagram when torque in the first rotational direction is input to an input shaft in the power transmission device of the second modification.

As illustrated in FIG. 10, a power transmission device 100B of the second modification is different from the first modification in including a plurality of coil springs (elastic bodies) 50. The coil spring 50 is disposed between the pressed surface 25 and the cylindrical roller 4. In addition, the coil spring 50 is disposed in a state of being compressed from its natural length. That is, the coil spring 50 is a compression spring, and the cylindrical roller 4 is constantly biased inward in the circumferential direction by the coil spring 50. This makes it possible to produce a state in which the cylindrical rollers 4 are caught between the inner circumferential surface 13 of the outer ring portion 10 and the cam surface 27 even with no external force input to an output shaft 2B, and restrict the rotation of the output shaft 2B. In addition, in the first embodiment, the rotation of the output shaft 2 is restricted after the output shaft 2 is slightly rotated by an external force. That is, in the first embodiment, there is backlash of the output shaft 2B in the circumferential direction. In contrast, the second modification can reduce the backlash of the output shaft 2B in the circumferential direction. This makes it possible to retain the position and orientation of other components connected to the output shaft 2B.

As illustrated in FIG. 10, the output shaft 2B of the second modification is different from the output shaft 2A of the first modification in that a hole 51 is formed in the pressed surface 25. The hole 51 accommodates a part of the coil spring 50. As illustrated in FIG. 11, the hole 51 is formed in a circular shape corresponding to the coil spring 50. As illustrated in FIG. 12, when torque is input to the input shaft 3A to move the pressing portion 32 in the circumferential direction, the coil spring 50 receives a compressive load and compressed between the pressed surface 25 and the cylindrical rollers 4. This allows the coil spring 50 to be entirely accommodated in the hole 51 in a compressed state. As a result, the cylindrical rollers 4 come into contact with the pressed surface 25. This causes the inner ring portion 20 to be pressed in a state where the cylindrical rollers 4 are in contact with the pressed surface 25, so as to rotate the output shaft 2B. As described above, the coil spring 50 is not to be interposed between the cylindrical rollers 4 and the pressed surface 25 when torque is transmitted.

The second modification has been described as above. However, in the present disclosure, the cylindrical roller 4 may be biased using an elastic body other than the coil spring 50. Although the second modification has described an example in which the elastic body (compression spring) is disposed between the pressed surface 25 and the cylindrical rollers 4, it is also allowable, in the present disclosure, to dispose the elastic body between the pressing surface 33 and the cylindrical roller 4. Incidentally, when the elastic body is disposed between the pressing surface 33 and the cylindrical rollers 4, the elastic body needs to be a tension spring that biases the cylindrical rollers 4 toward the pressing surface 33 instead of a compression spring.

Third Modification

Figure 13:
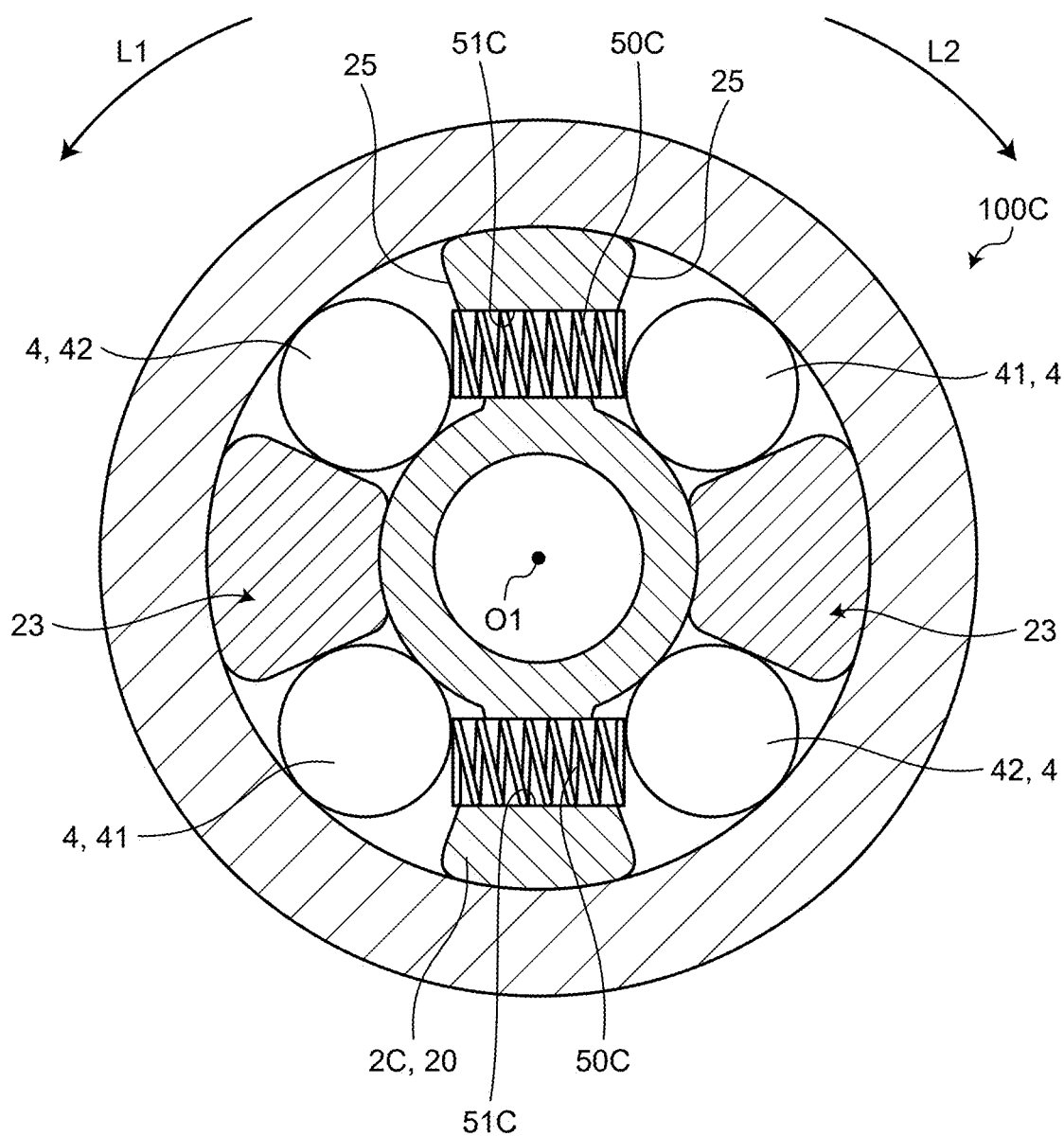
FIG. 13 is a cross-sectional view of a power transmission device of a third modification taken along the direction orthogonal to the axial direction.

FIG. 13 is a cross-sectional view of a power transmission device of a third modification taken along the direction orthogonal to the axial direction. As illustrated in FIG. 13, an output shaft 2C of a power transmission device 100C of the third modification is different from that of the second modification in that a through hole 51C is formed instead of the hole 51. The through hole 51C penetrates the pressed surface 25 of another recessed surface 23 on the back side of the pressed surface 25. That is, the through hole 51C internally communicates the recessed surfaces 23 adjacent to each other in the circumferential direction.

The power transmission device 100C of the third modification is different from the device of the second modification in using a coil spring 50C having an elongated shape instead of the coil spring 50. A central portion of the coil spring 50C in the length direction is disposed in the through hole 51C. Both ends of the coil spring 50C bias the two cylindrical rollers 4 disposed on mutually different recessed surfaces 23. Even in the third modification, backlash of the output shaft 2C in the circumferential direction is reduced similarly to the second modification.

Fourth Modification

Figure 14:
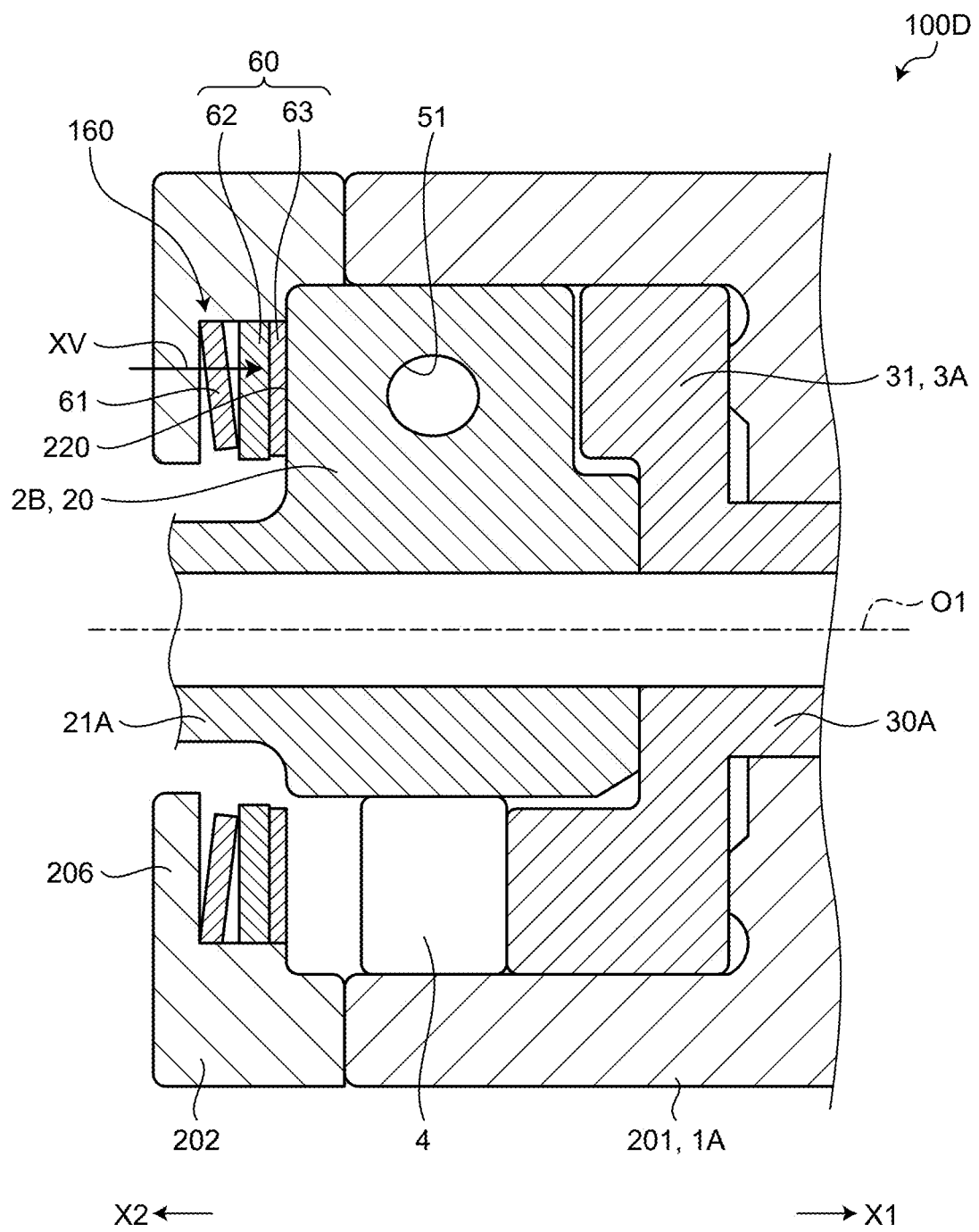
FIG. 14 is a cross-sectional view of a power transmission device of a fourth modification taken along the axial direction.
Figure 15:
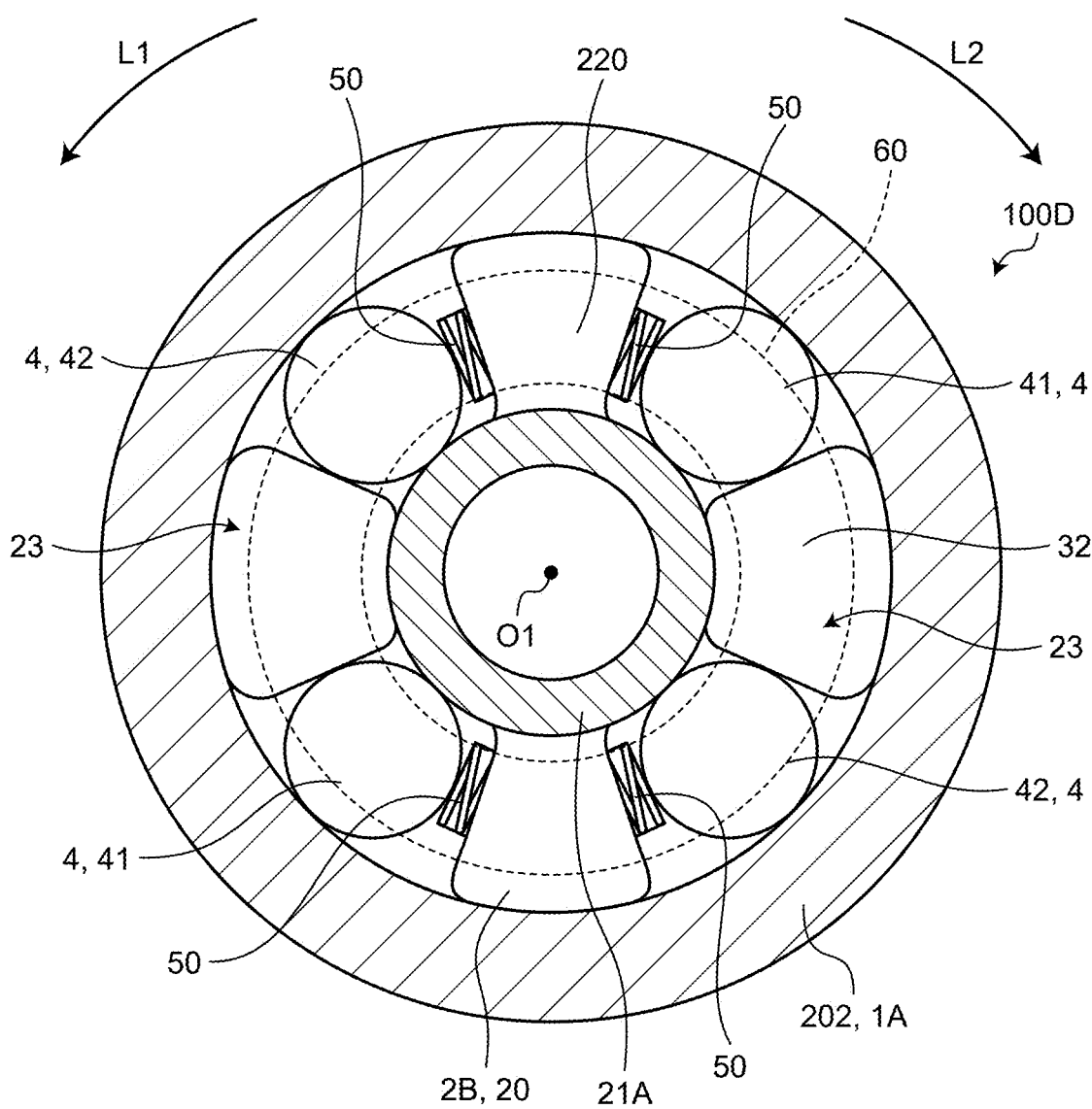
FIG. 15 is a side view as viewed from a direction of arrow XV in FIG. 14.

FIG. 14 is a cross-sectional view of a power transmission device of a fourth modification taken along the axial direction. FIG. 15 is a side view as viewed from a direction of arrow XV in FIG. 14. As illustrated in FIG. 14, a power transmission device 100D of the fourth modification is different from the second modification in including a friction portion 160. The friction portion 160 comes into contact with the output shaft 2B to exert a frictional force. The friction portion 160 of the fourth modification includes a friction plate 60 and a disc spring 61.

The friction plate 60 includes: a plate 62 serving as a base material; and a friction material 63 having a high friction coefficient and adhered to a surface of the plate 62 in the first direction X1. As illustrated in FIG. 15, the friction plate 60 is formed in an annular shape. The friction material 63 is in contact with a side surface 220 of the inner ring portion 20 of the output shaft 2B in the second direction X2.

The disc spring 61 is disposed between an inner flange 206 of the second fixing member 202 and the friction plate 60. The disc spring 61 is assembled in a state of exerting a biasing force in the axial direction. Accordingly, the friction material 63 is pressed by the disc spring 61 in the first direction X1, and exerts a high frictional force against the side surface 220 of the inner ring portion 20.

Next, the operation of the power transmission device 100D of the fourth modification will be described. For example, when torque in the first rotational direction L1 is input to the input shaft 3A, the pressing portion 32 moves in the first rotational direction L1. Subsequently, the first pressing surface 133 presses the first cylindrical rollers 41. This compresses the coil spring 50 between the first cylindrical roller 41 and the first pressed surface 125, which results in increasing the biasing force of the coil spring 50.

When the friction plate 60 is not pressed against the inner ring portion 20, the inner ring portion 20 might rotate in the first rotational direction L1 by the increased biasing force of the coil spring 50. That is, there is a possibility that the first cylindrical roller 41 will not be in contact with the first pressed surface 125. In contrast, according to the fourth modification, the friction plate 60 is pressed against the inner ring portion 20, and thus, the inner ring portion 20 is less likely to rotate. That is, even when the biasing force of the coil spring 50 increases, the inner ring portion 20 is not likely to rotate in the first rotational direction L1. This makes it possible for the first cylindrical rollers 41 moving in the first rotational direction L1 to reliably come in contact with the first pressed surface 125, allowing torque to be transmitted to the inner ring portion 20 of the output shaft 2A.

The fourth modification has been described above. Although the example in which the friction portion 160 is formed of the friction plate 60 and the disc spring 61 has been described in the fourth modification, it is also allowable, in the present disclosure, to use the friction portion 160 formed with the friction plate 60 alone, formed with the disc spring 61 alone, or use a configuration other than the friction plate 60 and the disc spring 61. Although the disc spring 61 is used as a member that presses the friction plate 60, another type of elastic body may be used in the present disclosure.

Fifth Modification

Figure 16:
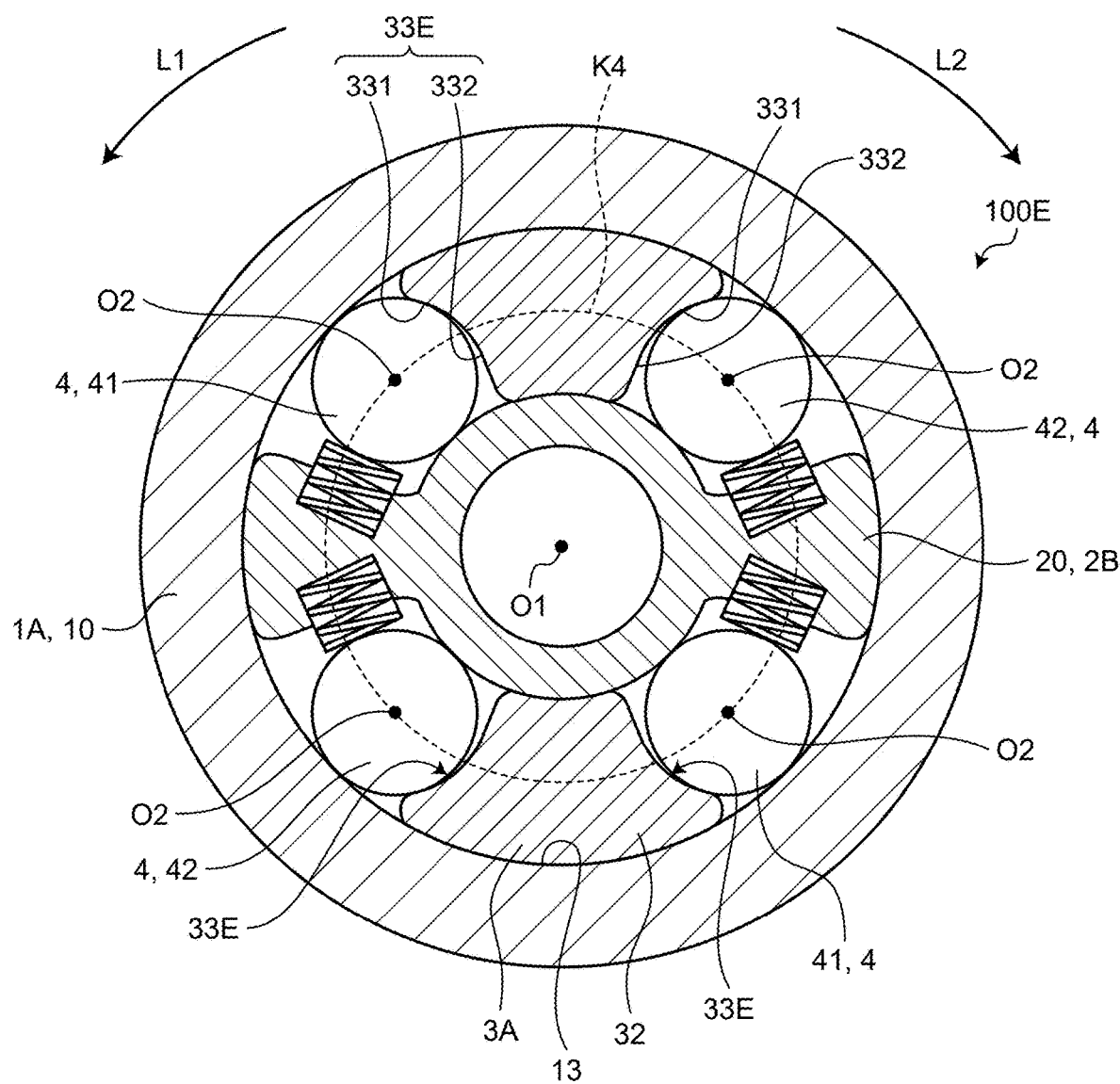
FIG. 16 is a cross-sectional view of a power transmission device of a fifth modification taken along the axial direction.
Figure 17:
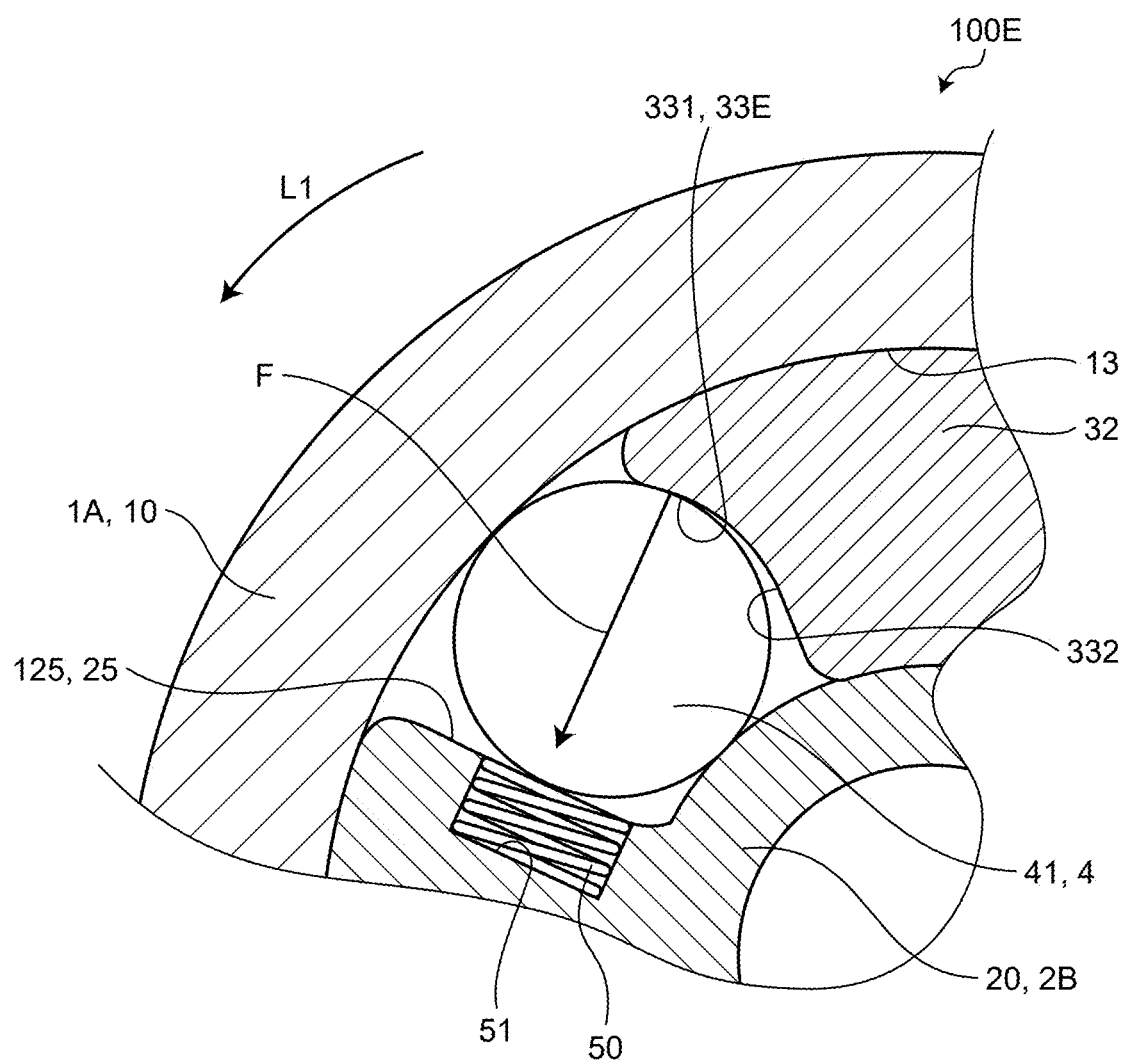
FIG. 17 is an enlarged view in which a part of a power transmission device of the fifth modification is enlarged.

FIG. 16 is a cross-sectional view of a power transmission device of a fifth modification taken along the axial direction. FIG. 17 is an enlarged view in which a part of a power transmission device of the fifth modification is enlarged. A power transmission device 100E of the fifth modification is different from the second modification in that a pressing surface 33E has a modified shape. Specifically, the pressing surface 33E includes: an outer surface 331 disposed outside an imaginary line K4; and an inner surface 332 disposed inside the imaginary line K4. The imaginary line K4 is a circle centered on a center line O1. The imaginary line K4 passes through a center O2 of the cylindrical roller 4 caught between the inner circumferential surface 13 and the cam surface 27.

The inner surface 332 extends along the imaginary line K1 (refer to FIG. 3). The outer surface 331 protrudes inward in the circumferential direction from the imaginary line K1 (refer to FIG. 3). Accordingly, the portion of the pressing surface 33E coming in contact with the cylindrical roller 4 is not the inner surface 332 but the outer surface 331. In addition, the outer surface 331 is inclined inward in the radial direction with respect to the imaginary line K1. Therefore, as illustrated in FIG. 17, when torque is input to the input shaft 3A to allow the pressing surface 33E to press the inner ring portion 20 across the cylindrical rollers 4, the outer surface 331 and the pressed surface 25 are substantially parallel to each other.

Here, as illustrated in FIG. 12, the pressing surface 33 in other cases such as the first embodiment and the first modification runs along the imaginary line K1 (refer to FIG. 3). A pressing force F1 of the pressing surface 33 includes a component F3 directed outward in the radial direction in addition to a normal vector F2 of the pressed surface 25. This increases the loss amount of the torque transmitted from the pressing portion 32 to the inner ring portion 20. In contrast, according to the fifth modification, the vector F in the pressing direction of the pressing surface 33E is a normal vector of the pressed surface 25. This makes it possible to extremely reduce the amount of torque loss transmitted from the pressing portion 32 to the inner ring portion 20, and efficiently transmit the torque.

The power transmission device has been described up to the fifth modification as described above. The power transmission device that has been described as an example is a device adopting an inner cam structure in which the outer ring portion 10 is constituted with the fixing member 1 and the inner ring portion 20 is constituted with the output shaft 2. However, the device of the present disclosure may adopt an outer cam structure in which the inner ring portion is constituted with the fixing member 1 and the outer ring portion is constituted with the output shaft 2. Hereinafter, a power transmission device to which the outer cam structure is applied will be briefly described.

Sixth Modification

Figure 18:
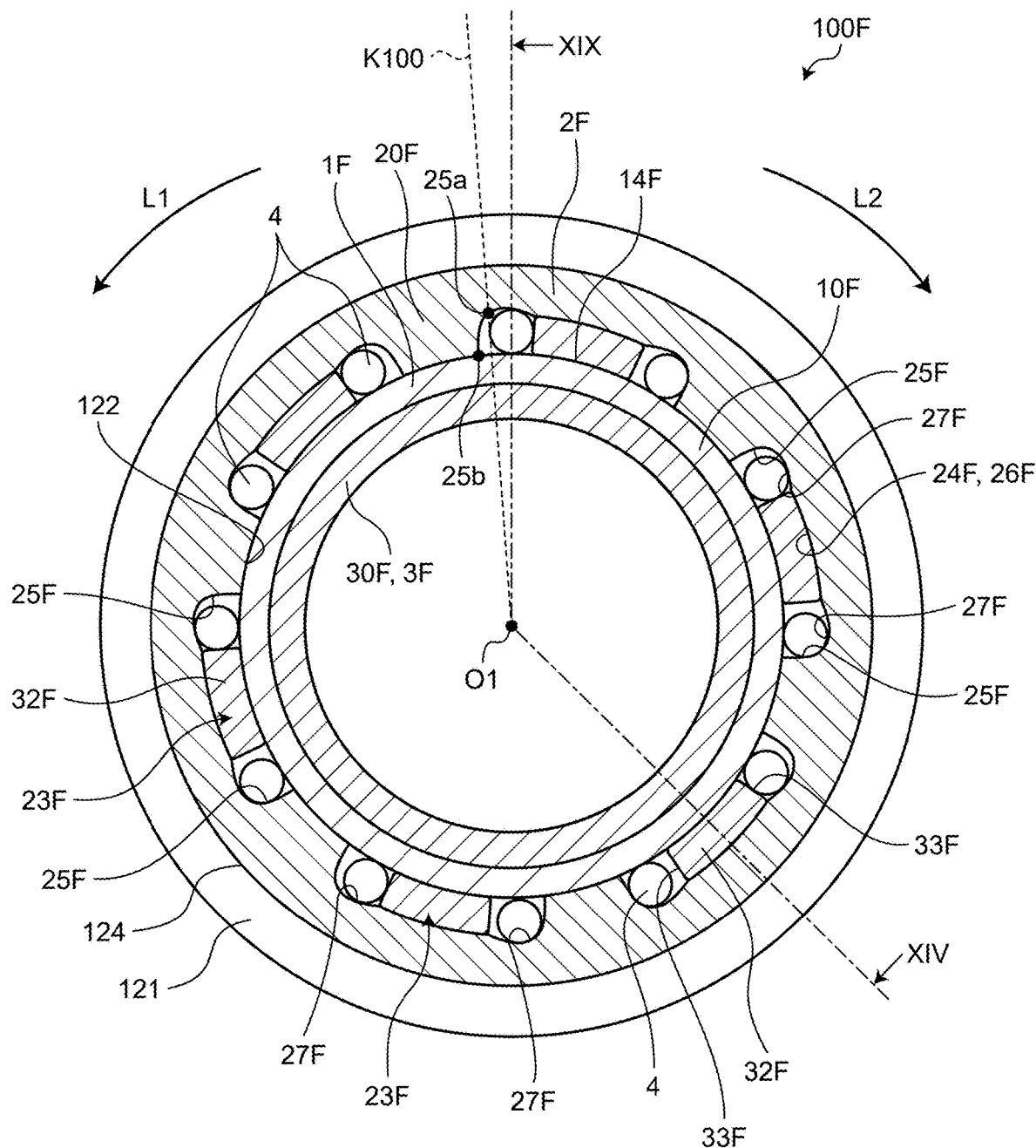
FIG. 18 is a cross-sectional view of the power transmission device of a sixth modification taken along the direction orthogonal to the axial direction, and specifically is a cross-sectional view taken along line XVIII-XVIII in FIG. 19.
Figure 19:
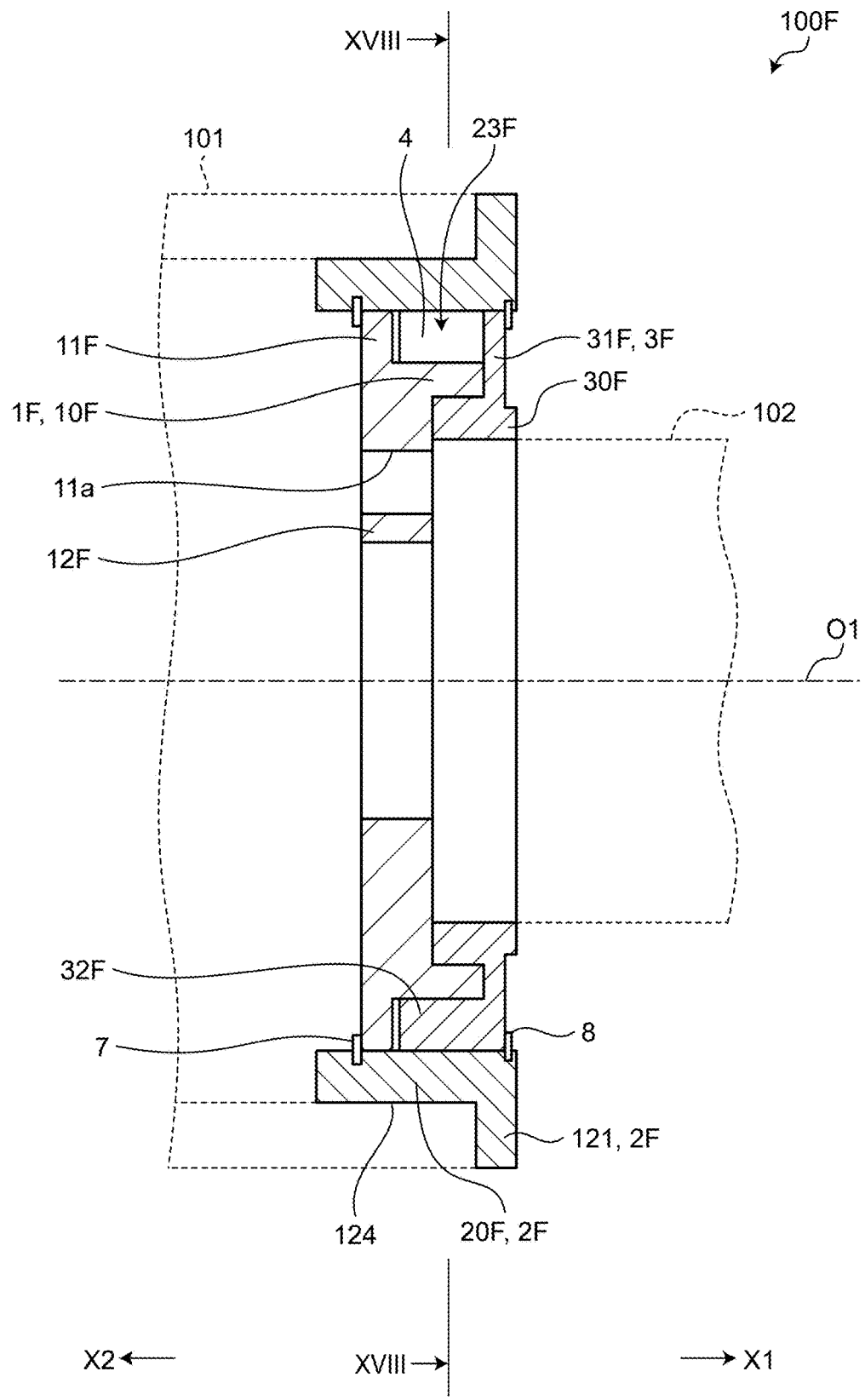
FIG. 19 is a cross-sectional view of the power transmission device of the sixth modification taken along the axial direction, and specifically is a cross-sectional view taken along line XIX-XIX in FIG. 18.

FIG. 18 is a cross-sectional view of the power transmission device of a sixth modification taken along the direction orthogonal to the axial direction, and specifically is a cross-sectional view taken along line XVIII-XVIII in FIG. 19. FIG. 19 is a cross-sectional view of the power transmission device of the sixth modification taken along the axial direction, and specifically is a cross-sectional view taken along line XIX-XIX in FIG. 18. As illustrated in FIG. 18, a power transmission device 100F of the sixth modification includes a fixing member 1F, an output shaft 2F, an input shaft 3F, and a plurality of cylindrical rollers 4. Since the cylindrical rollers 4 are the same as those in the first embodiment, they are denoted by the same reference numerals.

As illustrated in FIG. 19, the fixing member 1F includes an inner ring portion 10F, an outer flange portion 11F, and an inner flange portion 12F. As illustrated in FIG. 18, an outer circumferential surface (cylindrical surface) 14F of the inner ring portion 10F is formed in a circular shape around the center line O1. The outer flange portion 11F and the inner flange portion 12F are each disposed at ends of the inner ring portion 10F in the second direction X2. The inner flange portion 12F has a through hole 11a. Therefore, by fastening the inner flange portion 12F with a bolt (not illustrated), the power transmission device 100F can be fixed to another component.

The output shaft 2F includes an outer ring portion 20F and a flange 121. An outer circumferential surface 124 of the outer ring portion 20F is a fitting surface to which another component 101 that transmits torque from the power transmission device 100F (output shaft 2F) is to be fitted. An end surface of the another component 101 in the first direction X1 is in contact with the flange 121. There are provided retaining rings 7 and 8 on the inner circumferential side of the outer ring portion 20F at the ends in the first direction X1 and the second direction X2. The fixing member 1F and the output shaft 2F are caught by the retaining rings 7 and 8 in the axial direction. With this configuration, the fixing member 1F, the output shaft 2F, and the input shaft 3F are assembled so as not to be separated from each other.

As illustrated in FIG. 18, an inner circumferential surface (facing surface) 122 of the outer ring portion 20F is a facing surface that faces the outer circumferential surface 14F of the inner ring portion 10F. The inner circumferential surface 122 of the outer ring portion 20F is in contact with the outer circumferential surface 14F of the inner ring portion 10F so as to be slidable in the circumferential direction.

The inner circumferential surface 122 of the outer ring portion 20F has six recessed surfaces 23F recessed outward in the radial direction. The recessed surface 23F has a bottom surface 24F and a pressed surface 25F. The bottom surface 24F has a central surface 26F and a cam surface 27F.

The cylindrical roller 4 is disposed between the cam surface 27F and the outer circumferential surface 14F of the inner ring portion 10F. The diameter from the center line O1 to the cam surface 27F is formed to gradually increase from the central surface 26F toward the pressed surface 25F. That is, the distance between the outer circumferential surface 14F of the inner ring portion 10F and the cam surface 27F gradually increases toward the pressed surface 25. Therefore, when the cylindrical roller 4 moves toward the central surface 26F, the cylindrical roller 4 is caught between the cam surface 27F and an outer circumferential surface 14F. On the other hand, when the cylindrical roller 4 moves toward the pressed surface 25F, the cylindrical roller 4 is loosely fitted with clearance without being caught between the cam surface 27F and the outer circumferential surface 13F.

As illustrated in FIG. 19, the input shaft 3F includes: a second connecting portion 30F; a main body 31F extending outward in the radial direction from the second connecting portion 30F; and a plurality of pressing portions 32F protruding from the main body 31F in the second direction X2. The inner circumferential surface of the second connecting portion 30F is a fitting surface to which another component 102 that transmits torque to the power transmission device 100F (input shaft 3F) is to be fitted.

As illustrated in FIG. 19, the outer circumferential surface of the main body 31F is in contact with the inner circumferential surface 122 of the outer ring portion 20F so as to be slidable in the circumferential direction. The main body 31F covers the inside of the recessed surface 23F from the first direction X1. This configuration prevents the cylindrical roller 4 from falling off from the inside of the recessed surface 23F in the first direction X1.

As illustrated in FIG. 18, the pressing portion 32F is disposed inside the recessed surface 23F and on the inner circumferential side of the central surface 26F. Therefore, when the input shaft 3F is rotated by the transmitted torque, a pressing surface 33F of the pressing portion 32F presses the pressed surface 25F via the cylindrical roller 4. This transmits the torque to the outer ring portion 20F, so as to rotate the output shaft 2F. As described above, even with the power transmission device 100F of the sixth modification, the same operational effects as those of the first embodiment are obtained.

In addition, the pressed surface 25F of the output shaft 2F of the sixth modification is tilted outward in the circumferential direction with respect to an imaginary line K100 drawn from the center line O1 to the proximal end 25a of the pressed surface 25F (a portion joining the circumferential end of the bottom surface 24F). That is, similarly to the first embodiment, the distal end 25b is disposed on the outer side in the circumferential direction with respect to the imaginary line K100, causing the pressed surface 25F to be inclined outward in the circumferential direction. Therefore, the sixth modification has a reduced thickness of the oil film located between the outer circumferential surface 14F of the inner ring portion 10F and the cylindrical roller 4. When an external force is input to the output shaft 2F, the cylindrical roller 4 easily shear the oil film, reliably locking the output shaft 2F.

Note that the present disclosure may be a combination of the following configurations.

(1) A power transmission device including:
  a fixing member having a cylindrical surface, the cylindrical surface facing an inner side in a radial direction or an outer side in the radial direction;
  an output shaft having a facing surface facing the cylindrical surface;
  an input shaft having at least one or more pressing portion, the pressing portion disposed between the cylindrical surface and the facing surface; and
  a pair of rolling elements disposed between the cylindrical surface and the facing surface and on either side of the pressing portion in a circumferential direction,
  wherein the facing surface includes a recessed surface, the recessed surface being recessed in the radial direction and formed to accommodate the pressing portion and the pair of rolling elements, and
  the recessed surface includes:
  a bottom surface; and
  a pair of pressed surfaces extending in the radial direction from ends of the bottom surface in the circumferential direction and facing the circumferential direction,
  a surface of the pressing portion in the circumferential direction is a pressing surface that presses the pressed surface via the rolling element,
  the bottom surface includes:
  a central surface located at a central portion of the recessed surface in the circumferential direction, with the pressing portion being disposed between the central surface and the cylindrical surface; and
  a pair of cam surfaces located at either end of the recessed surface in the circumferential direction, with the rolling element being disposed between the cam surfaces and the cylindrical surface, and
  the cam surface is formed such that a distance between the cam surface and the cylindrical surface gradually increases from the central surface toward the pressed surface,
  a distance between a portion of the cam surface closer to the central surface and the cylindrical surface is smaller than a diameter of the rolling element, and
  a distance between the cylindrical surface and a portion of the cam surface closer to the pressed surface is greater than a diameter of the rolling element.

(2) The power transmission device according to (1),
  further comprising an elastic body configured to bias the rolling element,
  wherein the elastic body is either a compression spring disposed between the pressed surface and the rolling element and configured to bias the rolling element toward the pressing surface, or a tension spring disposed between the pressing surface and the rolling element and configured to bias the rolling element toward the pressing surface.

(3) The power transmission device according to (2),
  wherein the output shaft has a side surface facing an axial direction parallel to a center line of the cylindrical surface, and
  the power transmission device further comprises a friction portion coming in contact with the side surface to exert a frictional force.

(4) The power transmission device according to (1),
  wherein a virtual circle centered on the center line of the cylindrical surface and passing through a center of the rolling element in a state of being caught between the cylindrical surface and the cam surface is defined as a first imaginary circle, the pressing surface includes:
an inner surface disposed inside the first imaginary circle in the radial direction; and
an outer surface disposed outside the first imaginary circle in the radial direction, and
the outer surface protrudes more than the inner surface.

(5) The power transmission device according to (1), wherein
the pressed surface includes:
a proximal end that is an end in the radial direction to join the bottom surface, and
a distal end that is another end in the radial direction to be positioned opposite the proximal end, and
the pressed surface is disposed so as to be positioned more outward in the circumferential direction from the proximal end toward the distal end and is inclined toward outside in the circumferential direction.

(6) The power transmission device according to (1),
wherein the fixing member has an outer ring portion having an annular shape and having an inner circumferential surface being the cylindrical surface, and
the output shaft includes an inner ring portion, the inner ring portion disposed inside the outer ring portion and having an outer circumferential surface being the facing surface.

(7) The power transmission device according to (1),
wherein the fixing member has an inner ring portion having an outer circumferential surface being the cylindrical surface, and
the output shaft includes an outer ring portion having an annular shape, with the inner ring portion being disposed inside the outer ring portion, and an inner circumferential surface of the outer ring portion being the facing surface.

According to the power transmission device of the present disclosure, the torque is transmitted from the input shaft to the output shaft via the rolling elements being rigid bodies, making it possible to reduce the torque loss.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A power transmission device comprising:
a fixing member having a cylindrical surface, the cylindrical surface facing an inner side in a radial direction or an outer side in the radial direction;
an output shaft having a facing surface facing the cylindrical surface;
an input shaft having at least one or more pressing portion, the pressing portion disposed between the cylindrical surface and the facing surface; and
a pair of rolling elements disposed between the cylindrical surface and the facing surface and on either side of the pressing portion in a circumferential direction,
wherein the facing surface includes a recessed surface, the recessed surface being recessed in the radial direction and formed to accommodate the pressing portion and the pair of rolling elements,
wherein the recessed surface includes:
a bottom surface; and
a pair of pressed surfaces extending in the radial direction from ends of the bottom surface in the circumferential direction and facing the circumferential direction,
wherein a surface of the pressing portion in the circumferential direction is a pressing surface that presses the pressed surface via the rolling element,
wherein the bottom surface includes:
a central surface located at a central portion of the recessed surface in the circumferential direction, with the pressing portion being disposed between the central surface and the cylindrical surface; and
a pair of cam surfaces located at either end of the recessed surface in the circumferential direction, with the rolling element being disposed between the cam surfaces and the cylindrical surface,
wherein the cam surface is formed such that a distance between the cam surface and the cylindrical surface gradually increases from the central surface toward the pressed surface,
wherein a distance between a portion of the cam surface closer to the central surface and the cylindrical surface is smaller than a diameter of the rolling element,
wherein a distance between the cylindrical surface and a portion of the cam surface closer to the pressed surface is greater than a diameter of the rolling element,
wherein the pressed surface includes:
a proximal end that is an end in the radial direction to join the bottom surface; and
a distal end that is another end in the radial direction to be positioned opposite the proximal end,
wherein the pressed surface is disposed so as to be positioned more outward in the circumferential direction from the proximal end toward the distal end and is inclined toward outside in the circumferential direction, and
wherein the rolling element contacts the pressed surface such that a contact point with the rolling element is toward the bottom surface in the radial direction below a center of the roller.

2. The power transmission device according to claim 1, further comprising an elastic body configured to bias the rolling element,
wherein the elastic body is either a compression spring disposed between the pressed surface and the rolling element and configured to bias the rolling element toward the pressing surface, or a tension spring disposed between the pressing surface and the rolling element and configured to bias the rolling element toward the pressing surface.

3. The power transmission device according to claim 2, wherein the output shaft has a side surface facing an axial direction parallel to a center line of the cylindrical surface, and
wherein the power transmission device further comprises a friction portion coming in contact with the side surface to exert a frictional force.

4. The power transmission device according to claim 1, wherein a virtual circle centered on the center line of the cylindrical surface and passing through a center of the rolling element in a state of being caught between the cylindrical surface and the cam surface is defined as a first imaginary circle,
wherein the pressing surface includes:
an inner surface disposed inside the first imaginary circle in the radial direction; and an outer surface disposed outside the first imaginary circle in the radial direction, and wherein the outer surface protrudes more than the inner surface.

5. The power transmission device according to claim 1, wherein the fixing member has an outer ring portion having an annular shape and having an inner circumferential surface being the cylindrical surface, and wherein the output shaft includes an inner ring portion, the inner ring portion disposed inside the outer ring portion and having an outer circumferential surface being the facing surface.

6. The power transmission device according to claim 1, wherein the fixing member has an inner ring portion having an outer circumferential surface being the cylindrical surface, and wherein the output shaft includes an outer ring portion having an annular shape, with the inner ring portion being disposed inside the outer ring portion, and an inner circumferential surface of the outer ring portion being the facing surface.

\* \* \* \* \*